United States Patent
Boyer et al.

(10) Patent No.: US 10,460,168 B1
(45) Date of Patent: Oct. 29, 2019

(54) INTERFACES FOR IMPROVING DATA ACCURACY IN A POSITIONING SYSTEM DATABASE

(71) Applicant: VERIZON PATENT AND LICENSING INC., Basking Ridge, NJ (US)

(72) Inventors: Wesley Boyer, Washington, DC (US); Michael Chasen, Potomac, MD (US); Victor Quinn, Arlington, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 603 days.

(21) Appl. No.: 15/211,855

(22) Filed: Jul. 15, 2016

Related U.S. Application Data

(63) Continuation of application No. 15/004,092, filed on Jan. 22, 2016, now Pat. No. 10,198,456.

(Continued)

(51) Int. Cl.

| | |
|---|---|
| *G06F 17/30* | (2006.01) |
| *G06K 9/00* | (2006.01) |
| *G06F 3/0481* | (2013.01) |
| *G01C 21/36* | (2006.01) |
| *G01C 21/30* | (2006.01) |
| *G06Q 10/10* | (2012.01) |
| *G06F 16/29* | (2019.01) |
| *G06F 16/23* | (2019.01) |
| *G06F 16/58* | (2019.01) |

(Continued)

(52) U.S. Cl.
CPC ......... *G06K 9/00637* (2013.01); *G01C 21/30* (2013.01); *G01C 21/3673* (2013.01); *G06F 3/0481* (2013.01); *G06F 16/2365* (2019.01); *G06F 16/29* (2019.01); *G06Q 10/10* (2013.01); *G06F 16/2219* (2019.01); *G06F 16/2291* (2019.01); *G06F 16/285* (2019.01); *G06F 16/58* (2019.01); *H04W 4/021* (2013.01)

(58) Field of Classification Search
CPC .. G06F 16/29; G06F 16/2291; G06F 16/2219; G06F 16/285; G06F 16/58; G06F 16/9537; H04W 4/021; H04W 4/043; H04W 4/029; G01C 21/206; G01C 21/3638
USPC ........ 707/707, 737, 743, 758; 701/408, 409, 701/533
See application file for complete search history.

(56) References Cited

U.S. PATENT DOCUMENTS 8,913,083 B1 * 12/2014 Ogale .................. G06F 3/0481
345/632
9,019,266 B2 4/2015 Hoguet
(Continued)

*Primary Examiner* — Dangelino N Gortayo

(57) ABSTRACT

Methods for improving data accuracy in a positioning system database using aerial imagery are provided. In one aspect, a method includes obtaining a two-dimensional image providing an aerial perspective of a building including a business, and receiving from a user a path identifier indicative of a virtual roadway proximal to the building, a first identifier in the first two-dimensional image of a first edge, second edge, and entrance of the business relative to the building. The method also includes determining first, second, and third latitude and longitude pairings on a map for the first identifier, second identifier, and third identifier, respectively, and providing, for display in the image, an identification of the first edge, second edge, and entrance of the business. Systems and machine-readable media are also provided.

20 Claims, 36 Drawing Sheets

Related U.S. Application Data

(60) Provisional application No. 62/271,905, filed on Dec. 28, 2015.

(51) Int. Cl.
*G06F 16/22* (2019.01)
*G06F 16/28* (2019.01)
*H04W 4/021* (2018.01)

(56) References Cited

U.S. PATENT DOCUMENTS

| | | |
|---|---|---|
| 9,746,342 B2 | 8/2017 | Beyeler et al. |
| 10,198,456 B1 * | 2/2019 | Boyer ..................... G06F 16/29 |
| 2005/0177350 A1 | 8/2005 | Kishikawa |
| 2007/0110338 A1 | 5/2007 | Snavely et al. |
| 2010/0161207 A1 * | 6/2010 | Do ........................ G01C 21/36 |
| | | 701/532 |
| 2011/0064312 A1 | 3/2011 | Janky et al. |
| 2011/0143707 A1 | 6/2011 | Darby et al. |
| 2011/0242311 A1 | 10/2011 | Miyajima |
| 2011/0242319 A1 | 10/2011 | Miyajima |
| 2011/0246027 A1 | 10/2011 | Miyajima |
| 2011/0279452 A1 | 11/2011 | Ibe et al. |
| 2012/0040653 A1 * | 2/2012 | Mendis ................. G01S 5/0252 |
| | | 455/414.2 |
| 2012/0136623 A1 * | 5/2012 | Edge ..................... G01S 5/0284 |
| | | 702/150 |
| 2012/0237083 A1 | 9/2012 | Lange et al. |
| 2012/0262552 A1 | 10/2012 | Zhang et al. |
| 2012/0274642 A1 * | 11/2012 | Ofek ....................... G06T 17/05 |
| | | 345/441 |
| 2013/0103301 A1 | 4/2013 | Becker et al. |
| 2013/0169685 A1 | 7/2013 | Lynch |
| 2013/0346020 A1 * | 12/2013 | Pershing ................ G06Q 10/06 |
| | | 702/156 |
| 2014/0274151 A1 * | 9/2014 | Pattabiraman ........ H04W 4/029 |
| | | 455/456.3 |
| 2014/0313287 A1 | 10/2014 | Qi |
| 2015/0045058 A1 | 2/2015 | Rudow et al. |
| 2015/0245180 A1 * | 8/2015 | Lin ....................... G01S 5/0252 |
| | | 455/456.3 |
| 2015/0332329 A1 * | 11/2015 | Luo ........................ G06F 16/29 |
| | | 705/14.58 |
| 2015/0338234 A1 * | 11/2015 | Seastrom ........... G01C 21/3679 |
| | | 701/409 |
| 2016/0035096 A1 | 2/2016 | Rudow et al. |

* cited by examiner

1620

1622

| | | | | | 1601 |

PlaceKit : Venue Auto Update — Log out

[ REPLACED VENUES ] [ NEW VENUES ] [ CLOSING VENUES ]

| Date | Address | Old Venue | Status | Actions | |
|---|---|---|---|---|---|
| March 31, 2016 | 00000 N Division St Davenport IA 52806 | Prominebt Solutions LLS | Automatically Removed | CALL | CONFIRM | REJECT | |
| March 31, 2016 | 0000 Amherst Dr Manassas VA 20111 | Sofa's Cleaning Services | Automatically Removed | CALL | CONFIRM | REJECT | |
| March 31, 2016 | 000 Midiothian Tpke Midiothian VA 23113 | Aunt McRae's New Family Support | Automatically Removed | CALL | CONFIRM | REJECT | |
| March 31, 2016 | 000 Watson Blvd Warner Robins GA 31088 | Clan O'dea Photography | Automatically Removed | CALL | CONFIRM | REJECT | |
| March 31, 2016 | 0555 SW Calfornia St Portland OR 97219 | Supply Life LLC | Automatically Removed | CALL | CONFIRM | REJECT | |
| March 31, 2016 | 0 Cawood Lane Northwest Arkans Springdale AR 72764 | Delorey Home Improvements | Automatically Removed | CALL | CONFIRM | REJECT | 1623 |
| March 31, 2016 | 0 Doylestown St Doylestown OH 44230 | Mike Woodruff Construction | Automatically Removed | CALL | CONFIRM | REJECT | |
| March 31, 2016 | 0N159 Holland Ln Geneva IL 60134 | TLC Kitchen Cabinets | Automatically Removed | CALL | CONFIRM | REJECT | |
| March 31, 2016 | 0N775 Prince Crossing Rd West Chicago IL 60185 | Joan Kenny Reporting | Automatically Removed | CALL | CONFIRM | REJECT | |
| March 31, 2016 | 10000 Banburry Cross Dr Las Vegas Las Vegas NV 89144 | First United Mortgages | Automatically Removed | CALL | CONFIRM | REJECT | |
| March 31, 2016 | 10000 Beach Dr SW Calabash NC 28467 | Love Cleaners | Automatically Removed | CALL | CONFIRM | REJECT | |
| March 31, 2016 | 10000 California St Ste 2666 Omaha NE 68114 | Just | Automatically Removed | CALL | CONFIRM | REJECT | |

This image was taken: Tue Jun 30 2015 20:00:00 GMT-0400 (EDT)

FIG. 16C

INTERFACES FOR IMPROVING DATA ACCURACY IN A POSITIONING SYSTEM DATABASE

CROSS-REFERENCE TO RELATED APPLICATIONS

The present application claims the benefit of priority under 35 U.S.C. § 120 as a continuation from U.S. patent application Ser. No. 15/004,092 entitled "Improving Data Accuracy In A Positioning System Database" filed on Jan. 22, 2016, which claims priority to under 35 U.S.C. § 119 from U.S. Provisional Patent Application Ser. No. 62/271,905, entitled "Improving Data Accuracy in a Positioning System Database" filed on Dec. 28, 2015, the disclosures of which are hereby incorporated by reference in its entirety for all purposes.

TECHNICAL FIELD

The present disclosure generally relates to improving the accuracy of data used by a data processing system for providing a position in multi-dimensional space.

BACKGROUND

A person looking for a location of a building commonly uses a web mapping service to find the location of the building. Web mapping services commonly provide street maps, views of streets, and route planning for traveling. Such web mapping services may provide accurate positional data for streets and plots of land, but often lack data accuracy for buildings and business locations and their storefronts in those buildings.

For example, with reference to prior art FIG. 1A, which provides an example illustration 10 of a street map with businesses from a web mapping service, various businesses are inaccurately illustrated as being towards the center of their respective buildings or at an edge of a street. Specifically, a first business is shown as located 12 in a center of a building 14 representing by a polygon, while the actual location 16 (in phantom, as it is not actually identified on the prior art map) of the business is elsewhere. As a result, and as illustrated in the example illustration 20 of prior art FIG. 1B, directions 24 from a location of a user 22 to the location 12 of the business in the building 14 are incorrect when compared to the actual location 16 (in phantom, as it is not actually identified on the prior art map) of the business in the building 104. Furthermore, and as illustrated in the example illustration 30 of prior art FIG. 1C, it cannot be determined at which business a user 32 that is identified with certain coordinates as being within the building 14 is located, even though the user is in the actual location 16 (in phantom, as it is not actually identified on the prior art map) of the business.

The description provided in the background section should not be assumed to be prior art merely because it is mentioned in or associated with the background section. The background section may include information that describes one or more aspects of the subject technology.

SUMMARY

The disclosed system provides user interfaces to facilitate a process for accurately determining the location, edges, and physical positions of a physical object in a multi-dimensional space, such as the location, storefront, and entrance(s) of a business in building for a mapping service. The accurate data generated by the system can be used to provide more accurate street maps, directions, and current locations of individuals using a mapping service. The user interfaces assist a user with the accurate determination of the positions of the physical object by providing additional approaches to tagging complexes with multiple businesses, quality assurance (QA), user input management, and mapping tools.

According to certain aspects of the present disclosure, a computer-implemented method for improving data accuracy in a positioning system database using aerial imagery is provided. The method includes obtaining a first two-dimensional image providing an aerial perspective of a building including a business, receiving from a user a path identifier indicative of a virtual roadway proximal to the building, and receiving from the user a first identifier in the first two-dimensional image of a first edge of the business relative to the building, a second identifier of a second edge of the business relative to the building, and a third identifier of an entrance to the business relative to the building. The method also includes determining a first latitude and longitude pairing on a map for the first identifier, a second latitude and longitude pairing on the map for the second identifier, and a third latitude and longitude pairing on a map for the third identifier, and providing, for display in the first two-dimensional image, an identification of the first edge of the business based on the first identifier, an identification of the second edge of the business based on the second identifier, and an identification of the entrance of the business based on the third identifier.

According to certain aspects of the present disclosure, a system for improving data accuracy in a positioning system database using aerial imagery is provided. The system includes a memory including instructions, and a processor. The processor is configured to execute the instructions to obtain a first two-dimensional image providing an aerial perspective of a building including a business, receive from a user a path identifier indicative of a virtual roadway proximal to the building, and receive from the user a first identifier in the first two-dimensional image of a first edge of the business relative to the building, a second identifier of a second edge of the business relative to the building, and a third identifier of an entrance to the business relative to the building. The processor is also configured to execute the instructions to determine a first latitude and longitude pairing on a map for the first identifier, a second latitude and longitude pairing on the map for the second identifier, and a third latitude and longitude pairing on a map for the third identifier, and provide, for display in the first two-dimensional image, an identification of the first edge of the business based on the first identifier, an identification of the second edge of the business based on the second identifier, and an identification of the entrance of the business based on the third identifier.

According to certain aspects of the present disclosure, a non-transitory machine-readable storage medium including machine-readable instructions for causing a processor to execute a method for improving data accuracy in a positioning system database using aerial imagery is provided. The method includes obtaining a first two-dimensional image providing an aerial perspective of a building including a business, receiving from a user a path identifier indicative of a virtual roadway proximal to the building, and receiving from the user a first identifier in the first two-dimensional image of a first edge of the business relative to the building, a second identifier of a second edge of the business relative to the building, and a third identifier of an entrance to the business relative to the building. The method also includes determining a first latitude and longitude pairing on a map for the first identifier, a second latitude and longitude pairing on the map for the second identifier, and a third latitude and longitude pairing on a map for the third identifier, and providing, for display in the first two-dimensional image, an identification of the first edge of the business based on the first identifier, an identification of the second edge of the business based on the second identifier, and an identification of the entrance of the business based on the third identifier.

According to certain aspects of the present disclosure, a system for improving data accuracy in a positioning system database using aerial imagery is provided. The system includes means for obtaining a first two-dimensional image providing an aerial perspective of a building including a business. The system also includes means for receiving from a user a path identifier indicative of a virtual roadway proximal to the building, and receiving from the user a first identifier in the first two-dimensional image of a first edge of the business relative to the building, a second identifier of a second edge of the business relative to the building, and a third identifier of an entrance to the business relative to the building. The system also includes means for determining a first latitude and longitude pairing on a map for the first identifier, a second latitude and longitude pairing on the map for the second identifier, and a third latitude and longitude pairing on a map for the third identifier, and means for providing, for display in the first two-dimensional image, an identification of the first edge of the business based on the first identifier, an identification of the second edge of the business based on the second identifier, and an identification of the entrance of the business based on the third identifier.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 16A-C are example illustrations associated with a user interface for updating venue information for physical objects having identified location, edges, and physical positions in a multi-dimensional space.

Figure 1A:
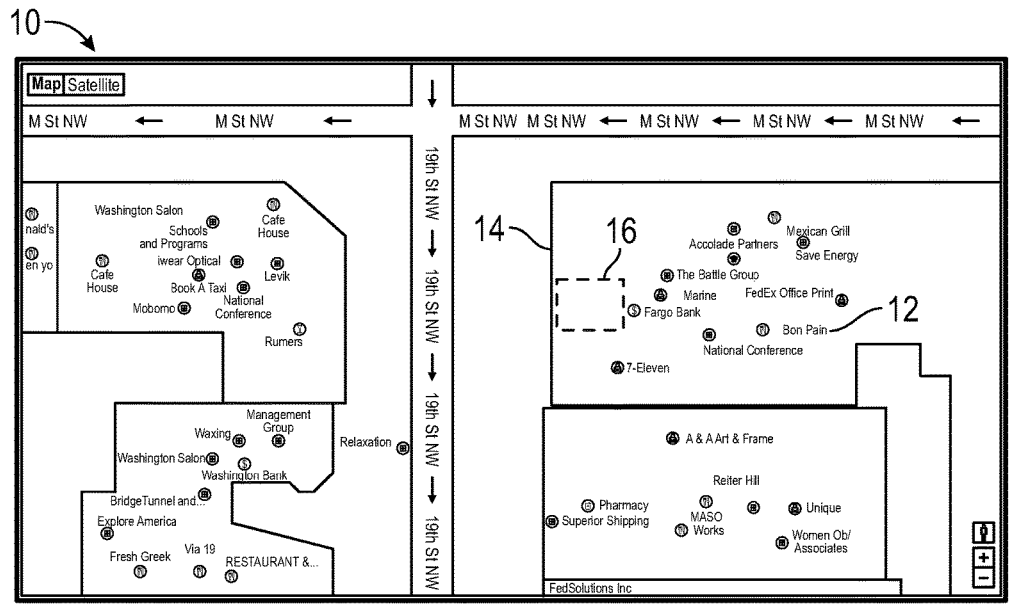
FIGS. 1A-1C provide example illustrations of prior art web mapping services.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides for more accurate positioning data for physical locations in an environment for storage in a positioning system database. The accurate positioning data can be obtained by way of an interface available on a server and accessible over a network via various client devices, the interface configured for permitting a user having access to the network to accurately identify physical aspects of physical locations using the interface, the identified physical aspects then being stored by the server in the positioning system database. The disclosed system addresses a problem of inaccurate or incomplete data stored in a positioning system database through the replacement or updating of the inaccurate or incomplete data with more accurate or more complete physical location data.

The disclosed system addresses a technical problem tied to computer technology and arising in the realm of computer networks, namely of inaccurate positional data stored in a positional database accessible over a network. The technical problem is addressed by way of a solution rooted in computer technology, namely by way of providing network access to a graphical user interface hosted on a server to a user so that the user can use the graphical user interface to obtain more accurate physical location data to be stored in a positional database to be hosted on a server. The more accurate and/or more complete physical location data stored in the positional database on the server can then be used by the same user or another user for various particular and useful applications, such as viewing more accurate map data, obtaining more accurate directions, or obtaining more accurate location information. The graphical user interface permits a user to identify, by way of a first-person perspective image or illustrated view from a position in physical space of a physical object in the physical space, physical aspects (e.g., boundaries, entrances) of the physical object and their location. The location of the identified physical aspects are then identified based on the known physical location and heading of the position of the view.

As a result, the disclosed system provides improvements to another technology and technical field, namely to the technology of positioning systems and the field of global positioning, by improving the accuracy of data used by the technology of positioning systems in the technical field of global positioning. As a result of the improvement data accuracy, users can obtain more accurate maps, directions, and location information relative to other physical objects or boundaries in an environment. In certain aspects, the disclosed system benefits from the use of specialized computing devices that include global positioning system receivers or other physical sensors that can obtain geographical location information for the respective computing devices to which they are coupled.

While many examples are provided herein in the context of store fronts for businesses located in buildings, the principles of the present disclosure contemplate the accurate location of other types of physical objects in a physical space as well. For example, any physical object viewable in an image of a physical space from a position having a location and bearing in the physical space can be more accurately located and positioned using the systems and methods disclosed herein, including, for example, signage, windows, statues or sculptures, trees, street signs such as stop signs, speed limit signs, parking meters, trash cans, bus stops, etc.

Furthermore, although the examples described herein with respect to the disclosed system are used to determine the projection of a physical location on a two-dimensional plane (e.g., latitude and longitude), the disclosed system can also be configured to determine a location in three-dimensional space and generate a three-dimension model of an object. For example, in order to obtain the height, width, and depth of a building from a position from which a photograph is taken, a user can, using the disclosed user interface displaying a building using at least two photographs taken from different positions, for example, identify the top left corner of the building. Using the latitude/longitude of the location where both images were taken and the rotation/azimuth (angle of inclination) of the camera, the system could approximate the full height of the building and generate a three-dimensional version of the building.

Example System Architecture

Figure 2A:
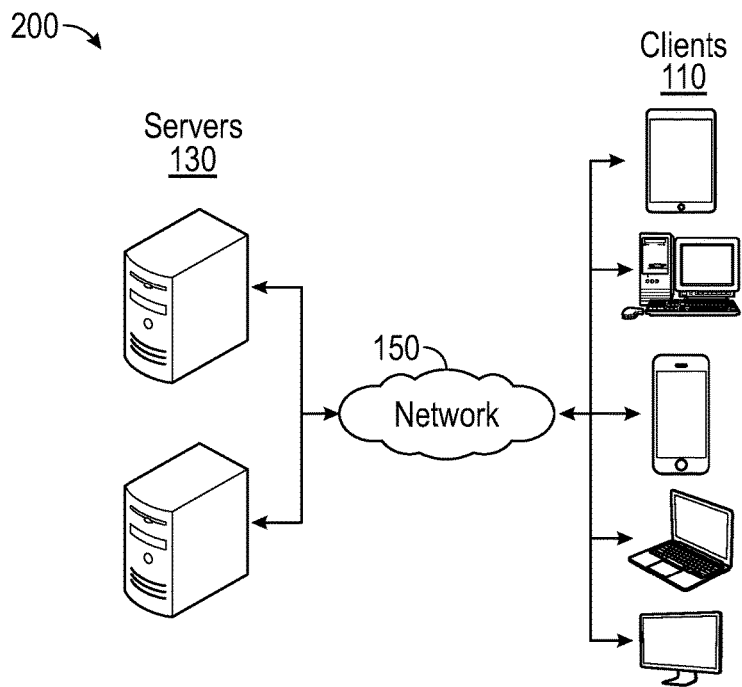
FIG. 2A illustrates an example architecture for improving data accuracy in a positioning system database by accurately determining the location, edges, and physical positions of a physical object in a multi-dimensional space.

FIG. 2A illustrates an example architecture 200 for improving data accuracy in a positioning system database by accurately determining the location, edges, and physical positions of a physical object in a multi-dimensional space. The architecture 200 includes servers 130 and clients 110 connected over a network 150.

One of the many servers 130 is configured to host a location application and a mapping database. For purposes of load balancing, multiple servers 130 can host the location application and/or mapping database. The servers 130 can be any device having an appropriate processor, memory, and communications capability for hosting data encoder service. The location application provides a graphical user interface accessible over the network 150 for a user of one of the clients 110 to provide information that will assist with accurately determining the location of a business. The clients 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

The information provided by the user on the client 110 using the user interface of the location application facilitates the location application with identifying the latitude and longitude of a left and right side of a storefront of the business, where the entrances (e.g., doors) of the business are located, and where on a map (e.g., a building outline on a map) the business is located. The location information provided by the user is then stored in the mapping database on a server 130.

Figure 2B:
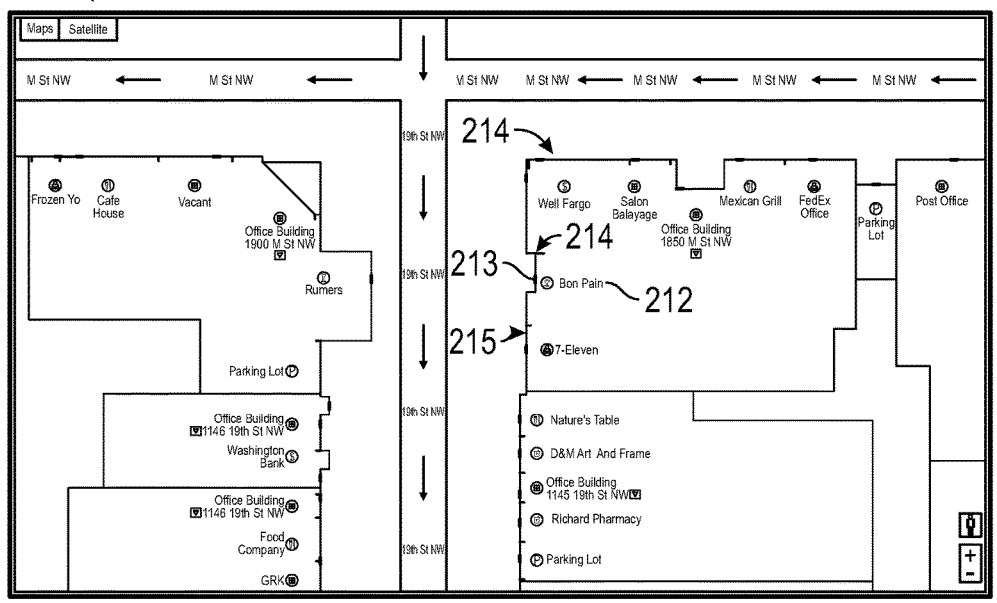
FIGS. 2B-2D provide example illustrations of maps that accurately identify the locations of businesses with respect to buildings as provided by the disclosed system.

The updated location information can assist with rendering more accurate maps, as provided in the example map 210 of FIG. 2B. Specifically, in FIG. 2B, the business 212 is displayed in its accurate physical location with respect to the building 214 as compared to the inaccurate display of the same business 12 shown in the example map 10 of prior art FIG. 1A. Furthermore, the boundaries of the storefront of the business 212 with respect to the building 214 are identified as well. The accurate physical locations of various other businesses in the building 214 are also identified in the example map 210 of FIG. 2B.

Figure 1B:
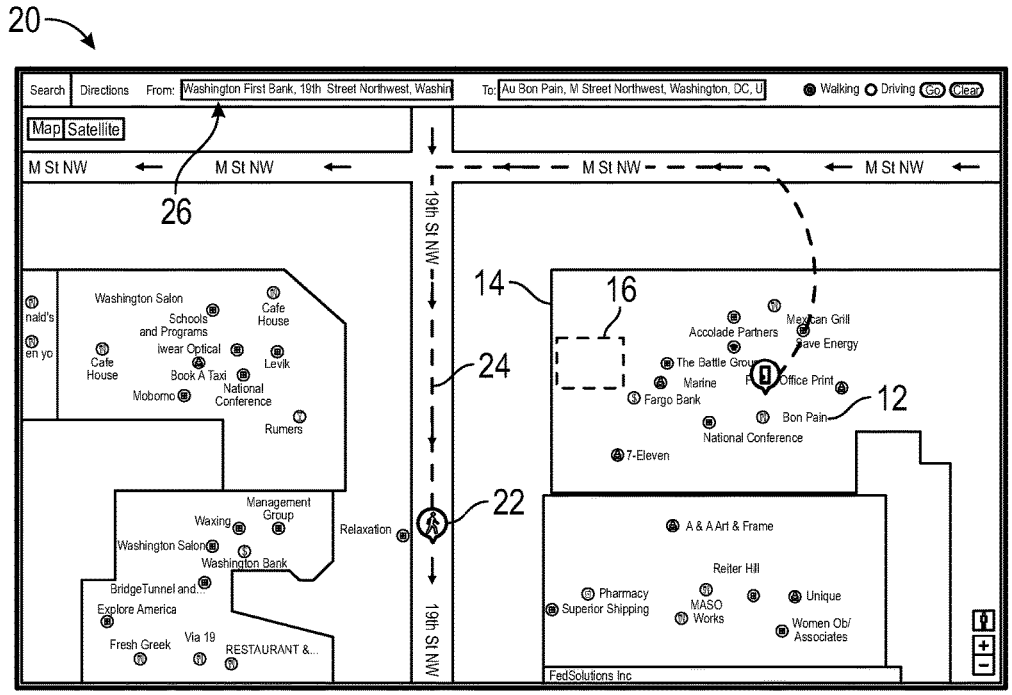
Figure 2C:
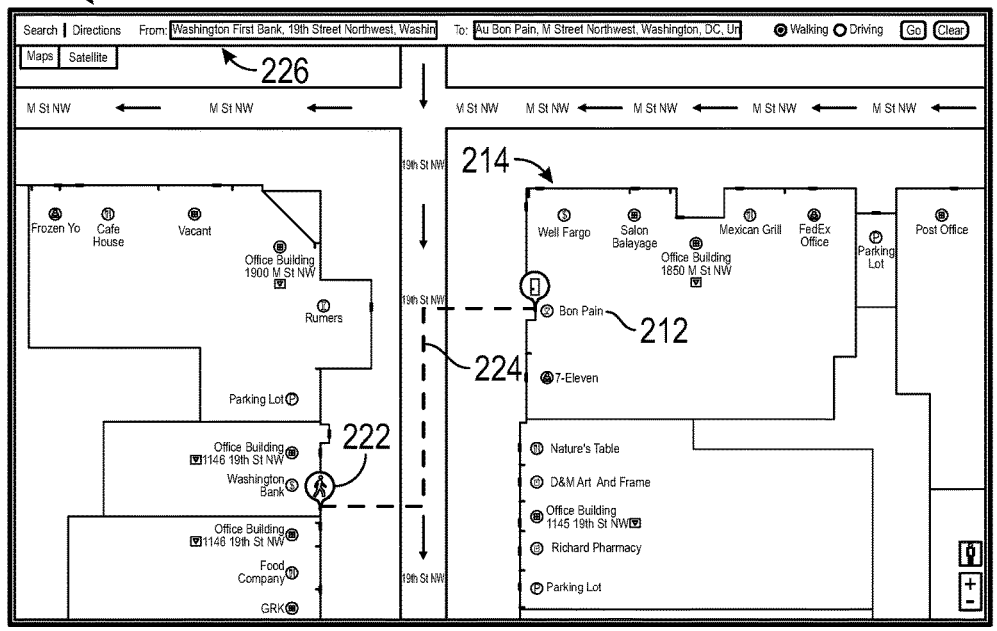

The updated location information can also assist with providing more directions to businesses, as provided in the example map 220 of FIG. 2C. Specifically, in FIG. 2C, a user is directed from a starting location 222 to the storefront of the business 212 in the building 214, which is across the street from the user's starting location 222. In existing direction systems with existing map data, the user would be directed from the starting location 222 to another street, as shown in the example map 20 of prior art FIG. 1B.

Figure 1C:
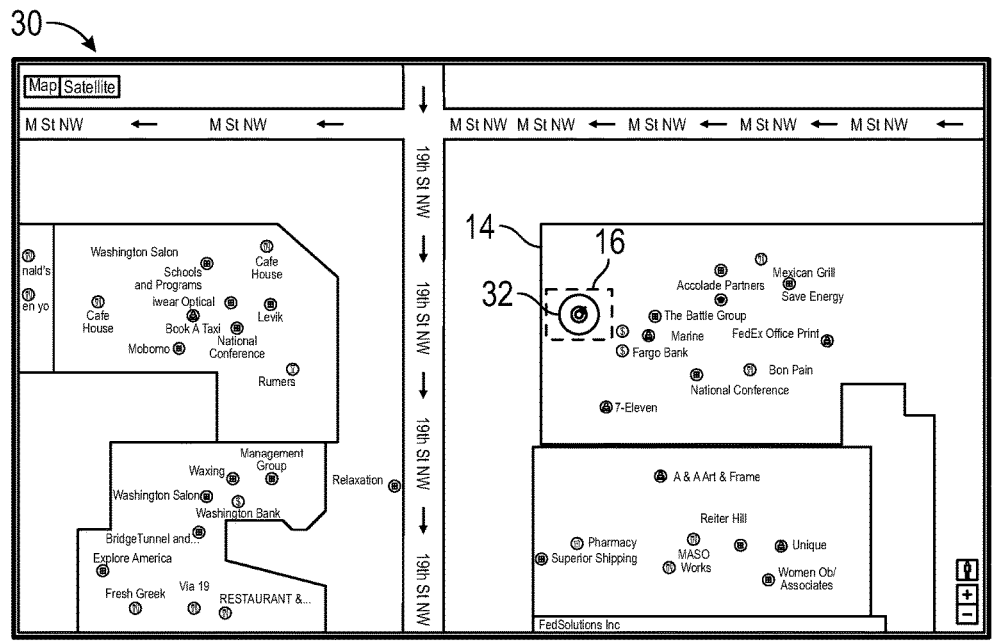
Figure 2D:
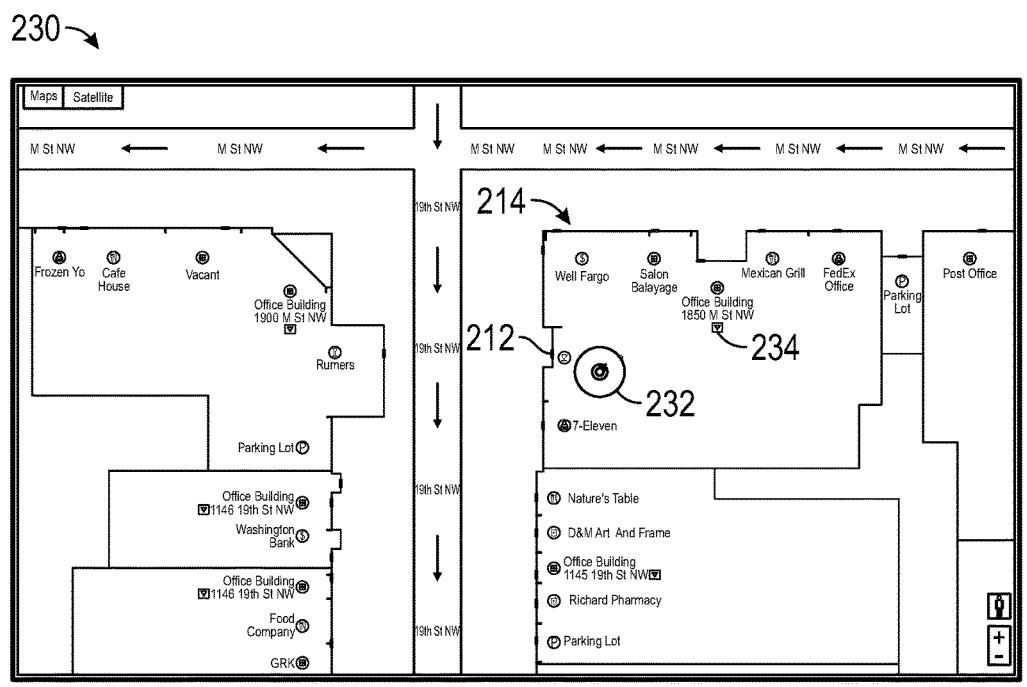

The updated location information can also assist with determining what businesses (or "venues") a person is located at or in based on location information for the person. For example, with reference to the example map 230 of FIG. 2D, it can be determined from the location information 232 for a person that the person is located at the business 212 in the building 214. In existing mapping systems with existing map data, as shown in the example map 30 of prior art FIG. 1C, the person may be identified as being in the building 14 based on the person's location information 32, but could not be identified as being at any particular business. Also included in the example map 230 of FIG. 2D is an option menu 234 to find out more information about the business 212 at which the person is located.

The updated location information can be of particular use to various other industries, such as location based advertising, computer vision, machine learning, and data analyses. For example, with updated location information, an entity can run a computer vision process to systematically look at all storefronts using the accurate latitude, longitude, and heading information to orient a camera view in an attempt to identify businesses from signs above their entrances. As another example, with updated location information that includes known venue names as tagged by a user, an entity could use a supervised machine learning algorithm with the tagged venues as the training data to find an automated way to ascertain the venues for which the identified entrances are associated. As yet a further example, a mobile device can use GPS or other location data from the device to identify, with a high degree of accuracy, every location the mobile device travels to according to the updated location information provided by the disclosed system in order to build a profile of user behavior for targeted location-based advertising to the user associated with the mobile device.

Various approaches to permitting a user to identify the latitude and longitude of a left and right side of a storefront of the business, where the entrances (e.g., doors) of the business are located, and where on a map (e.g., a building outline on a map) the business is located using the graphical user interface of the location application (e.g., in a web browser on a client 110) are disclosed herein. The graphical user interface is a tool that places a user virtually on a street and navigates by way of photographs of the street to a photograph of a front of a building. The user then selects (e.g., using an input device of a client 110) on physical features (e.g., boundaries, entrances) of the building in the photograph. By knowing the latitude and longitude of the point from which the photograph was taken and using one of various approaches disclosed herein, the disclosed system is able to determine the location of a physical feature of the building on a map.

For example, in a first approach to permitting a user to identify the latitude and longitude of a left and right side of a storefront and entrance of a business, two two-dimensional images (e.g., photographs) of a street-level view of a building are used. A user viewing each photograph of the building using the location application identifies the same physical features of the building in both of the images. Taking into account the position (e.g., latitude and longitude) from which each photograph was taken and the heading (e.g., direction) of the photograph, a virtual axis is cast out from the position of the origin of the photograph for each identified physical feature in each photograph, and the point at which the two axes intersect for each physical feature for the two photographs is determined to be the actual location (e.g., latitude and longitude) of the physical feature.

As another example, in a second approach to permitting a user to identify the latitude and longitude of a left and right side of a storefront and entrance of a business, one two-dimensional image (e.g., photograph) of a street-view of a building is used. The user viewing the photograph of the building using the location application identifies physical features of the building in the images. Taking into account the position (e.g., latitude and longitude) from which the photograph was taken and the heading (e.g., direction) of the photograph, a virtual axis is cast out from the position of the origin of the photograph for each identified physical feature in the photograph, and the point at which each axis for each physical feature intersects a polygon representative of the building on the map as identified by the location application is determined to be the actual location (e.g., latitude and longitude) of the physical feature.

As yet another example, in a third approach to permitting a user to identify the latitude and longitude of a left and right side of a storefront and entrance of a business, one two-dimensional image (e.g., photograph) of a street-view of a building is used. The user viewing the photograph of the building using the location application identifies physical features of the building in the images. Taking into account the position (e.g., latitude and longitude) from which the photograph was taken and the heading (e.g., direction) of the photograph, a virtual axis is cast out from the position of the origin of the photograph for each identified physical feature in the photograph, and a map is displayed to the user illustrating the point at which each axis for each physical feature intersects a polygon representative of the building on the map. The user then identifies the intersection point, and the location (e.g., latitude and longitude) associated with the intersection point is determined to be the actual location of the physical feature.

Example Positioning Database Data Accuracy Improvement System

Figure 3:
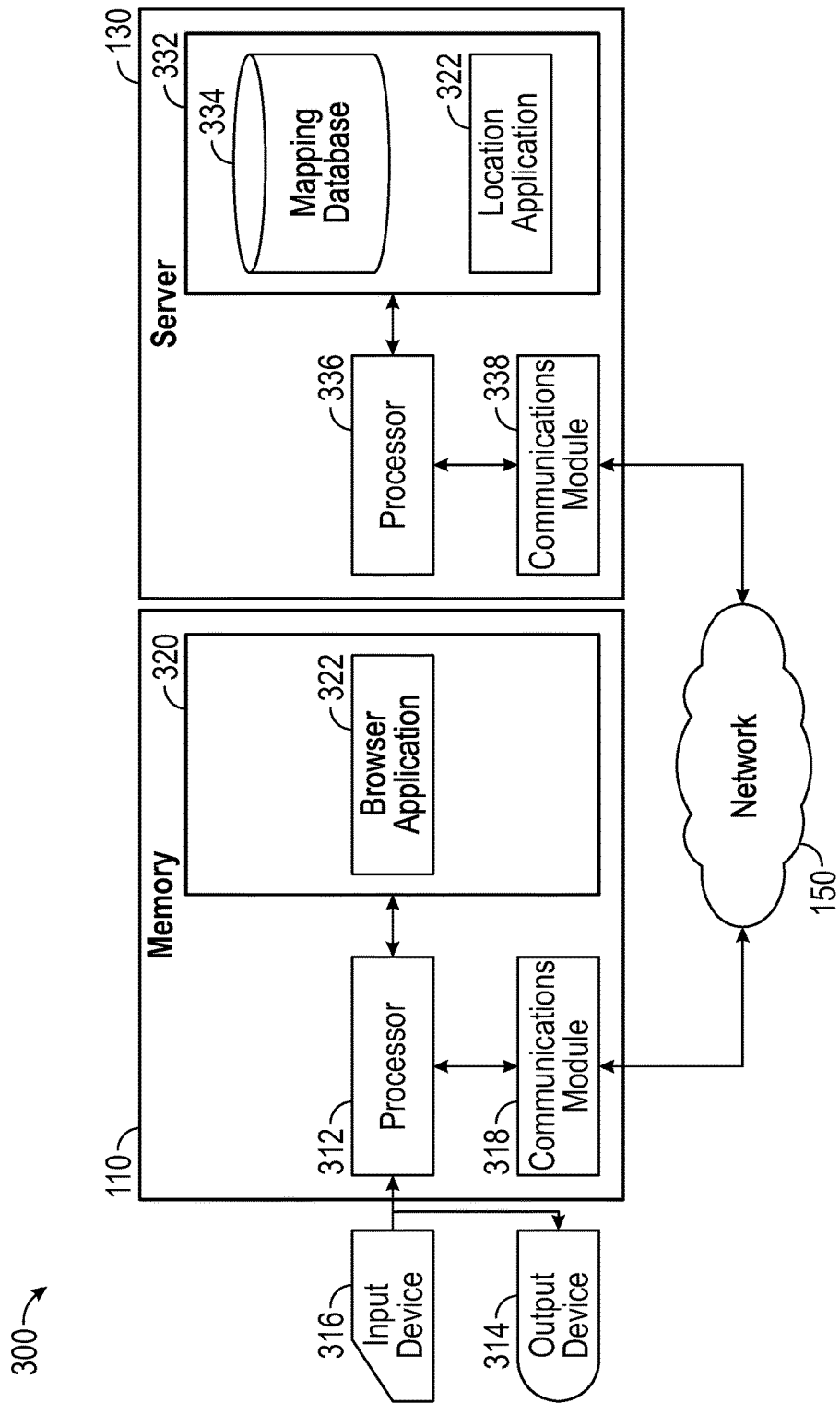
FIG. 3 is a block diagram illustrating an example client and server from the architecture of FIG. 2A according to certain aspects of the disclosure.

FIG. 3 is a block diagram 300 illustrating an example client 110 and server 130 from the architecture 200 of FIG. 2A according to certain aspects of the disclosure that are configurable to implement the systems and methods disclosed herein. The client 110 and the server 130 are connected over the network 150 via respective communications modules 318 and 338. The communications modules 318 and 338 are configured to interface with the network 150 to send and receive information, such as data, requests, responses, and commands to other devices on the network 150. The communications modules 318 and 338 can be, for example, modems or Ethernet cards.

The server 130 includes a processor 336, a communications module 338, and a memory 332 that includes a mapping database 334 and a location application 340.

The mapping database 334 can include geographical maps, including street maps and business locations. The mapping database 334 can also include two-dimensional images (e.g., street-level images and aerial images) providing first person perspectives and aerial perspectives of businesses along the streets. Each two-dimensional image can be associated with orientations (e.g., headings that are north, south, east, west, or any combination thereof) of the camera with which the image was taken, as well latitude and longitude pairings. The mapping database can also include polygon information for buildings represented in the maps. In certain aspects, the polygon information includes latitude and longitude for all vertices of a given building used to form an outline of the building to be displayed on a map based on the vertices. One or multiple edges of a polygon can represent a storefront of a business. For example, a portion of a single edge of a polygon can represent a storefront of a business when the side of a building associated with the business is represented by a single line on the map. As another example, multiple edges of a polygon can represent a storefront of a business when the side of a building associated with the business is represented by a multiple lines on the map (e.g., the storefront is not a flat shape). Other services can provide at least some of the information in the mapping database 334, including services that provide street level imagery such as GOOGLE STREET VIEW, BING STREETSIDE, HERE/YAHOO MAPS, services that provide maps (e.g., overhead views of roads with their names, polygons for buildings, addresses, points of interest, etc.) such as GOOGLE MAPS, BING MAPS, YAHOO MAPS, OPEN STREET MAP, MAPQUEST, and building polygon data provided by cities as made available for zoning purposes.

The processor 336 of the server 130 is configured to execute instructions, such as instructions physically coded into the processor 336, instructions received from software in memory 332, or a combination of both. For example, the processor 336 of the server 130 executes instructions from the location application 340 to obtain a first two-dimensional image (e.g., from the mapping database 334) providing an aerial perspective of a building that includes a business, which can then be provided for display to a user via respective communications modules 318 and 338 of the client 110 and server 130 over the network 150 on the client 110 using the output device 314 of the client 110. The processor 336 of the server is further configured to receive from the user a path identifier indicative of a virtual roadway proximal to the building. The user can provide the path identifier using an input device 316 of the client 110, and the path identifier can be communicated to the server 130 over the network 150. The path identifier can be, for example, a line drawn by the user on the two-dimensional image of the aerial perspective of the building in the browser application 322 displaying the two-dimensional image using the input device 316 of the client 110.

The processor 336 is further configured to receive from the user a first identifier in the first two-dimensional image of a first edge of the business relative to the building, a second identifier of a second edge of the business relative to the building, and a third identifier of an entrance to the business relative to the building, and determine a first latitude and longitude pairing on a map for the first identifier, a second latitude and longitude pairing on the map for the second identifier, and a third latitude and longitude pairing on a map for the third identifier. The first, second, and third identifiers can be visual indicators placed by the user on the two-dimensional image of the aerial perspective of the building using the input device 316 of the client 110. In certain aspects, the processor 336 is configured to receive from the user a modification to at least one of the first identifier, the second identifier, or the third identifier, and update the first latitude and longitude pairing, the second latitude and longitude pairing, or the third latitude and longitude pairing based on the respective modification. For example, if the user moves the position of the visual indicator placed by the user, then the latitude and longitude pairing of that indicator is updated accordingly.

The processor 336 is further configured to provide, for display in the first two-dimensional image, an identification of the first edge of the business based on the first identifier, an identification of the second edge of the business based on the second identifier, and an identification of the entrance of the business based on the third identifier. The identifications can be, for example, visual indicators on the first two-dimensional image indicative of the edges and entrance of the business. In certain aspects, the processor 336 is configured to provide, for display, an interface for the user to identify a name of the business. For example, a selectable popup window listing names for nearby businesses can be provided, and/or an input field for the user to type the name of the business can be provided. Additionally, in certain aspects, the processor 336 is configured to provide, for display in the first two-dimensional image, an identification of the boundaries of the business with respect to the building. For example, the boundaries can be indicated by lines, rectangles, or other shapes overlaid onto the two-dimensional image.

In certain aspects, the latitude and longitude pairings for the first identifier, second identifier, and third identifier are the latitude and longitude values associated with the visual point on the map where the first, second, and third identifiers are placed by the user. In certain other aspects, however, the latitude and longitude pairings for the first identifier, second identifier, and third identifier can be determined using another approach, such as an approach identified in priority U.S. patent application Ser. No. 15/004,092 entitled "Improving Data Accuracy In A Positioning System Database," filed on Jan. 22, 2016, incorporated by reference herein. Specifically, in these aspects, the processor 336 is configured to identify a first axis directed along a first heading in the direction of the first edge of the business and passing through a first position on the map, identify a second axis directed along the first heading in the direction of the second edge of the business and passing through the first position on the map, identify a third axis directed along the first heading in the direction of the entrance of the business and passing through the first position on the map, identify a fourth axis directed along a second heading in the direction of the first edge of the business and passing through a second position on the map, identify a fifth axis directed along the second heading in the direction of the second edge of the business and passing through the second position on the map, and identify a sixth axis directed along the second heading in the direction of the entrance of the business and passing through the second position on the map. The processor 336 is further configured to identify, as the first latitude and longitude pairing on the map, a first point on the first axis that is an intersection on the map between the first axis and the fourth axis, identify, as the second latitude and longitude pairing on the map, a second point on the second axis that is an intersection on the map between the second axis and the fifth axis, and identify, as the third latitude and longitude pairing on the map, a third point on the third axis that is an intersection on the map between the third axis and the sixth axis.

In certain aspects, the processor 336 is further configured to obtain a second two-dimensional image (e.g., from the mapping database 334) providing a first person perspective (e.g., a street level view) of the building that includes the business, and provide, for display (e.g., in the browser application 322 using the output device 314 of the client 110 after being sent over the network 150) in the second two-dimensional image, an identification of the first edge of the business based on the first latitude and longitude pairing for the first identifier, an identification of the second edge of the business based on the second latitude and longitude pairing for the second identifier, and an identification of the entrance of the business based on the third latitude and longitude pairing for the third identifier.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Dashboard

Figure 4:
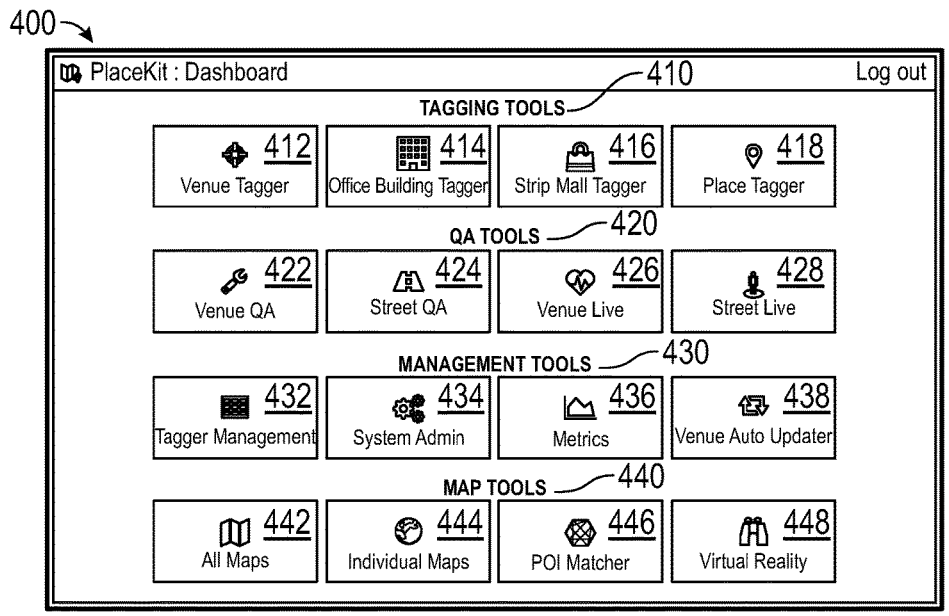
FIG. 4 in an example illustration associated with a menu screen for selecting user interfaces to facilitate a process for accurately determining the location, edges, and physical positions of a physical object in a multi-dimensional space as described herein.

FIG. 4 in an example illustration 400 associated with a menu screen or "dashboard" provided by the location application 340 for selecting user interfaces to facilitate a process for accurately determining the location, edges, and physical positions of a physical object in a multi-dimensional space as described herein. The illustration 400 provides user interface dashboard, displayable in the browser application 322 on the client 110, for selecting various tools for use by a user of the disclosed system, including tagging tools 410, quality assurance tools 420, management tools 430, and map tools 440. The tagging tools 410 include location information gathering tools, such as a venue tagger 412, office building tagger 414, strip mall tagger 416, and place tagger 418. The quality assurance tools 420 include tools used for ensuring the quality of data gathered by the disclosed system, including tools for venue quality assurance 422, street quality assurance 424, venue tagging live viewing 426, and street presence live viewing 428. The management tools 430 are tools provided for the tools management of the data gathered by the disclosed system, including users provide location identification data (or "taggers") management 432, system administration 434, metrics 436, and venue auto updated 438. The map tools provide information regarding maps generated for the tools displayed in the dashboard as well as other mapping tools, including accessing all maps 440, individual maps 444, a point of interest matcher 446, and virtual reality view 448. In certain aspects, access to the dashboard is limited to users having a higher degree (e.g., administrative level) of access relative to taggers.

Venue Tagger

FIGS. 5A-5G are example illustrations associated with the venue tagger 412 interface for permitting a user to identify the location, edges, and physical positions of a physical object in a multi-dimensional space.

Figure 5A:
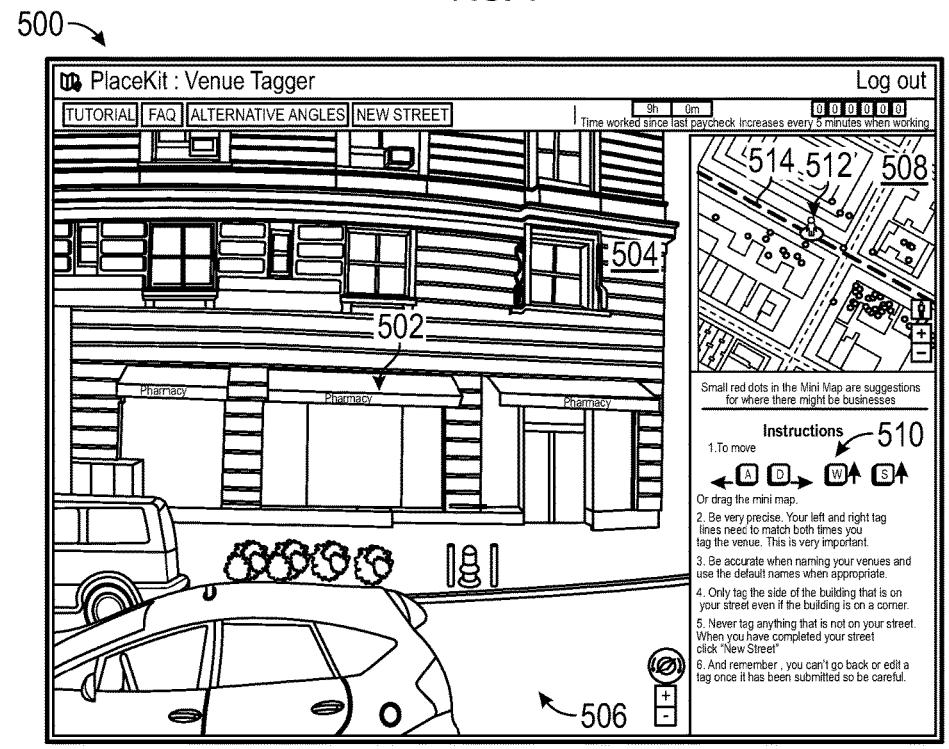
FIGS. 5A-5G are example illustrations associated with a user interface for permitting a user to identify the location, edges, and physical positions of a physical object in a multi-dimensional space.
Figure 5B:
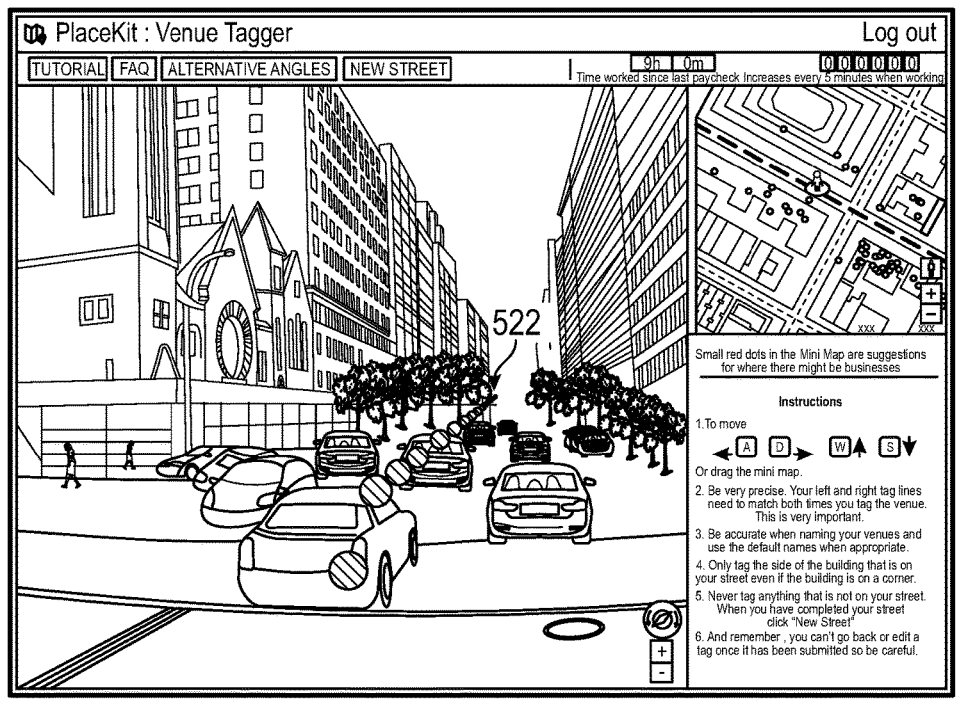

With reference to the example illustration 500 of FIG. 5A, the venue tagger tool, which is described in more detail in priority U.S. patent application Ser. No. 15/004,092 entitled "Improving Data Accuracy In A Positioning System Database," filed on Jan. 22, 2016, incorporated by reference herein, is a primary data gathering tool for improving data accuracy in the mapping database 334. In the example illustration 500, the tagger is assigned to identify the location, edges, and physical positions of physical objects ("tag" or "tagging") on a selected street and is provided with a street-level image of a building 504 housing a business 502, along with a map view 508 of a position of the tagger on the street 514, indicated by an icon of a person 512 in a direction of the heading/orientation from which the street-level image was photographed. Also provided are instructions 510 to the tagger.

The tagger is assigned the responsibility to virtually move up and down their assigned street in the virtual environment and find every business with a street level entrance, and for each business, tag the left side, right side, and all entrances from two different street points (i.e., two different street-level photographs). As provided in the example illustration 520 of FIG. 5B, the assigned street can be indicated by spheres 522 provided for display in the street-level photograph that the user can select in order to move along the assigned street. Once the tagging process for a business is completed by the user, the location application 340 is configured to triangulate the left side, right side, and each identified entrance of the business using the two perspectives and arrive at highly accurate geographic location data for each of the identified objects. The venue tagger 412 interface can also be used to tag street signs, fire hydrants, bus stations, or anything else visible in the virtual environment. After the tagger tags a business, the tagger is presented with a graphical user interface box where the tagger can select the name of the business from a list, search for the name of the business, provide a name for the business (if the business name does not appear in the list or search), or flag the business as one of a handful of special cases such as an apartment building or shopping center.

Figure 5C:
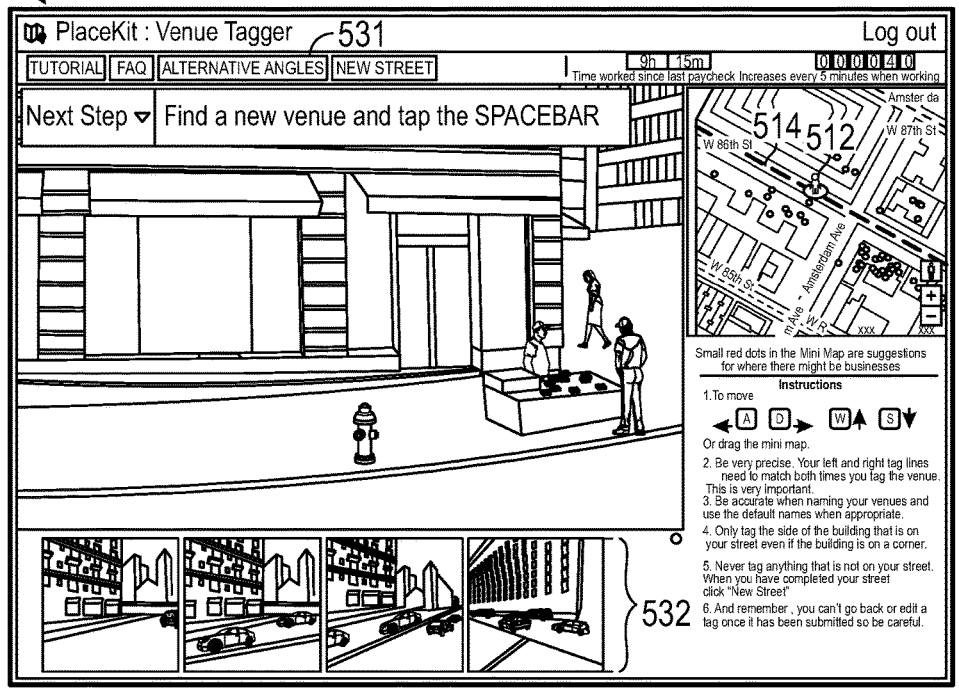

With reference to the example illustration 530 of FIG. 5C, if the tagger selects the "alternative angles" button 531 in the toolbar, the tagger is presented with a pane on the bottom of the interface that includes alternate street-level photographs 532 of the business 502 or building 504 from other angles or other photographs taken at other times. This is helpful for the tagger in the event that there is construction, or a vehicle blocking the view of the business in a default street-level photograph 506, or the business name appears difficult to read in the default street-level photograph 506. The tagger can select one of the alternative street-level photographs 532 to find a more suitable viewpoint and then tag the business.

Figure 5D:
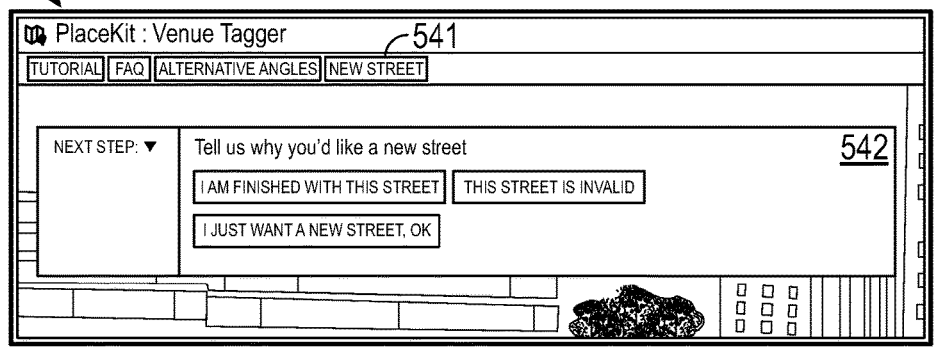

With reference to the example illustration 540 of FIG. 5D, the tagger may select the "New Street" button 541 to request a new street to tag, and in response the tagger will be presented within the venue tagger 412 tool with a window 542 options as to why the tagger is requesting a new street which, the response to which is stored in the mapping database 334. The options include being finished with the current assigned street, the current assigned street being invalid, or unconditional request for a new street. If the tagger indicates the tagger is finished with the current assigned street, the current assigned street is marked as finished in the mapping database (e.g., and not assigned to another tagger at a subsequent time) and the current assigned street is placed in a queue for quality assurance (e.g., using the street quality assurance 424 tool). The tagger is instructed to mark a street as finished when the tagger is confident the tagger has tagged all venues on the street. If the tagger marks a street as invalid, then the street is flagged as invalid and will not be reassigned to another tagger and will not be placed in queue for quality assurance. A street is to be marked invalid by a tagger if the street has no possible venues to be tagged. If a tagger indicates an unconditional request for a new street, the tagger is assigned a new street to tag and the currently assigned street of the tagger is returned to a queue to be assigned to another tagger for processing.

In certain aspects, the prioritization of street assignments to taggers is an important feature of the venue tagger 412 tool. Streets are prioritized for assignment to taggers according to various approaches. In one approach, each available street identified in the mapping database (e.g., more than four million miles of streets in the United States) are divided into segments roughly one kilometer long. Each of these street segments is then assignable to a tagger. The location application 340 is configured process each of the street segments by running an algorithm that assigns a score to each street segment based on the number of venues associated with that street segment, with the venue information being provided by a database of existing venues accessible by or otherwise included in the mapping database 334. The score for each street segment is increased in proportion to the number of venues associated with the street segment. The street segments are then assigned to taggers beginning with the unassigned street segment having the highest associated score, in descending order of the associated score. In certain aspects, a score for a street segment can be manually adjusted (e.g., by an administrative user) in order to, for example, increase the scores for street segments in a particular region. This manual adjustment allows for the prioritization of street segments in selected areas to be assigned to taggers more quickly. For example, if an administrator would like to ensure that the identification of businesses in the Washington, D.C., area is fairly complete before moving on to other regions, the location application 340 can, using an algorithm, will boost the scores of all street segments in the Washington, D.C., area by 500%, which will in effect ensure that all street segments assigned to taggers would be from the Washington, D.C., area until all of those streets have their tagging completed by taggers. As noted above, after a tagger has completed a street segment and marked it as finished, the street segment is removed from the pool of streets to be assigned to other taggers. If a tagger marks a street segment as invalid, it is also removed from the pool of streets to be assigned to other taggers.

Figure 5E:
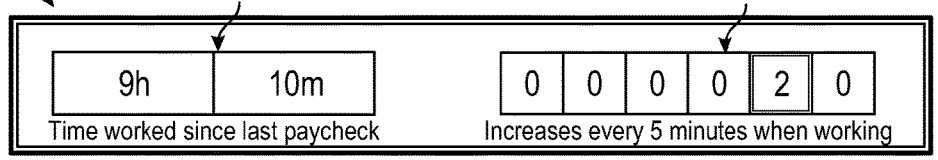

With reference to the example illustration 550 of FIG. 5E, a work timer is provided. The work timer is provided as part of the venue tagger 512 tool in order to address the problem of fairly compensating a large number of taggers working at various hours each day. The work timer is incremented and indicates payment to taggers for certain selected durations of time (e.g., for every five-minute window) in which the taggers performs an action. The actions include, for example, tagging a business, performing quality assurance on a tagged business, finding an office building, and more. The work timer consists of two panels. A first panel 551 indicates the total time worked by the tagger since their last paycheck, and the second panel 552 indicates a running count of the number of actions performed in each time block (e.g., five-minute block). As time progresses and a new five-minute block begins, each of the values shifts one place to the left and the new five-minute block enters on the right.

Office Building Tagger

Figure 5F:
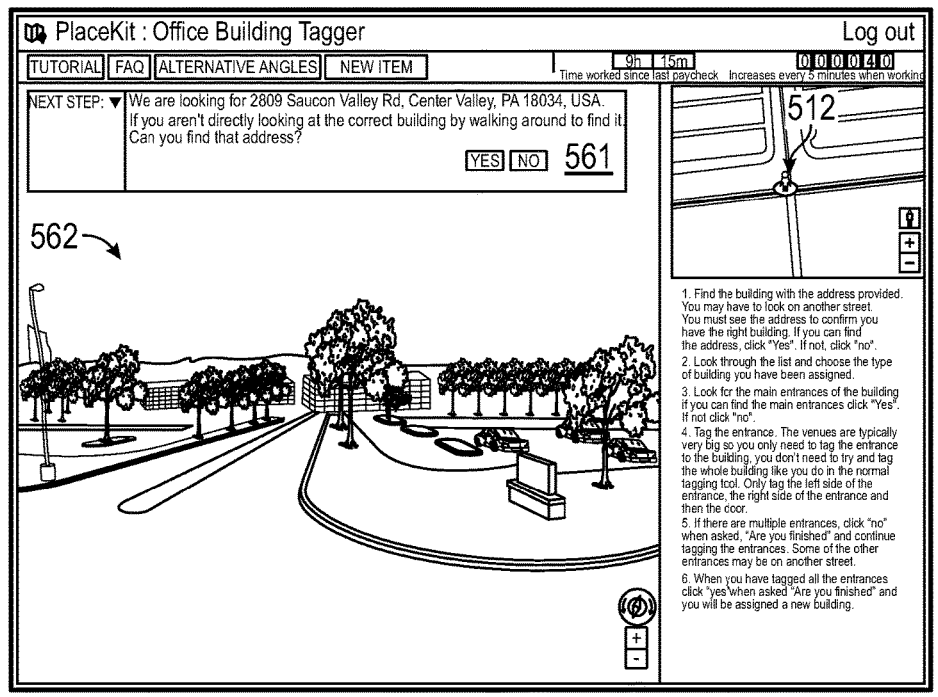

With reference to the example illustration 560 of FIG. 5F, a graphical user interface for an office building tagger 414 tool is provided. In certain aspects, the office building tagger 414 tool is an inversion of the venue tagger 412 tool in that instead of a tagger being assigned a street segment and having to virtually traverse up and down the street segment to tag businesses, the tagger is assigned an address of an office building and asked to find and tag it on a street segment. Although an office building is provided as an example, the office building tagger 414 tool is intended to be used to tag buildings have a single entrance for multiple businesses, such as an office building, hospital, shopping center, or other similar structures. The office building tagger 414 tool facilitates the assignment of an appropriate category to an identified building once it is tagged. The example illustration 560 includes a step-by-step instructions window 561 overlaid on a street-level image 562 of a building on a street segment, and a map of the street segment with an indicator of the position 512 at which the street-level image 562 was photographed.

Figure 5G:
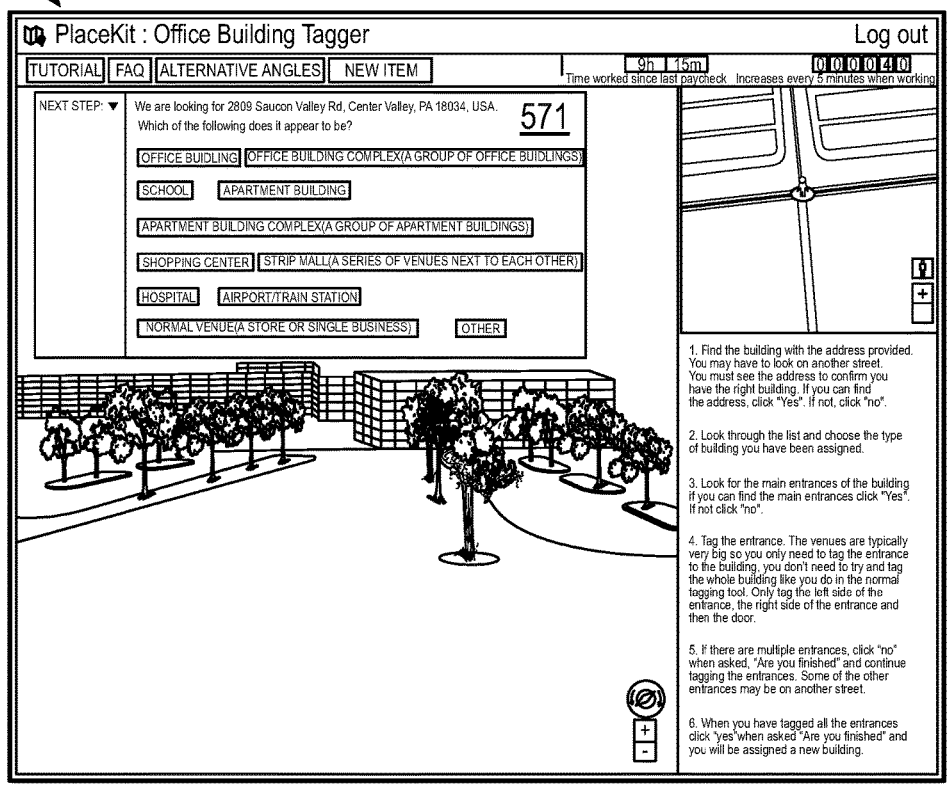

With reference to the example illustration 570 of FIG. 5G, a subsequent step in the use by a tagger of the office building tagger 414 tool is illustrated. In the illustration 560, the tagger is asked choose the type of business at the assigned address from a list of types of businesses 571 when the tagger is able to find the assigned address using the office building tagger 414 tool. After identifying the type of building (e.g., office building, school, apartment building, shopping center, strip mall, hospital, airport, etc.), the tagger is instructed to tag the building in the same manner as the venue tagger 412 tool by identifying the left side, right side, and all entrances to the building, and then repeating this identification of the left side, right side, and all entrances to the building using a different street-level image taken from another position on the street segment. After the tagger is finished with tagging a building, the tagger is assigned another building and repeats the tagging process.

Strip Mall Tagger

Figure 6:
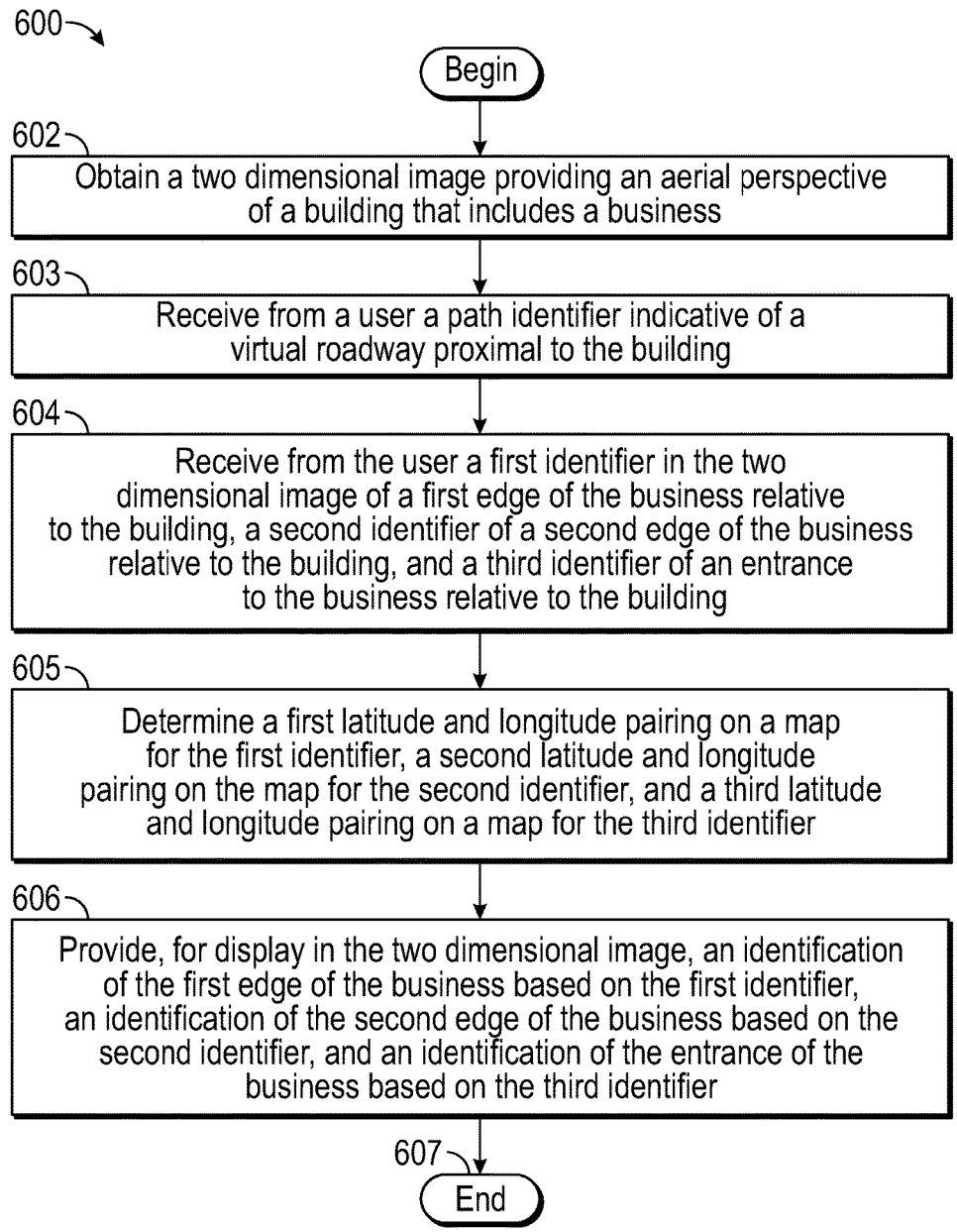
FIG. 6 illustrates an example process for improving data accuracy in a positioning system database using aerial imagery using the example server of FIG. 2A.

FIG. 6 illustrates an example process 600 for improving data accuracy in a positioning system database using aerial imagery using the strip mall tagger 416 tool and the example server of FIG. 2A. While FIG. 6 is described with reference to FIG. 2A, it should be noted that the process steps of FIG. 6 may be performed by other systems.

The process 600 begins by proceeding from beginning step 601 when a tagger initiates the strip mall tagger 416 tool to step 602 when a two-dimensional image is obtained that provides an aerial perspective of a building that includes a business. Next, in step 603, a path identifier is received from a user indicating a virtual roadway proximal to the building. In step 604, a first identifier in the two-dimensional image of a first edge of the business relative to the building, a second identifier of a second edge of the business relative to the building, and a third identifier of an entrance to the business relative to the building is received from the user, and in step 605 a first latitude and longitude pairing on a map for the first identifier, a second latitude and longitude pairing on the map for the second identifier, and a third latitude and longitude pairing on a map for the third identifier are determined. Finally, in step 606, an identification of the first edge of the business based on the first identifier, an identification of the second edge of the business based on the second identifier, and an identification of the entrance of the business based on the third identifier are provided for display in the two-dimensional image, and the process 300 ends in step 607.

FIG. 6 set forth an example process 600 for improving data accuracy in a positioning system database using aerial imagery using the strip mall tagger 416 tool and the example server of FIG. 2A. An example will now be described using the example process 600 of FIG. 6, and tagging a coffee store at a strip mall.

Figure 7A:
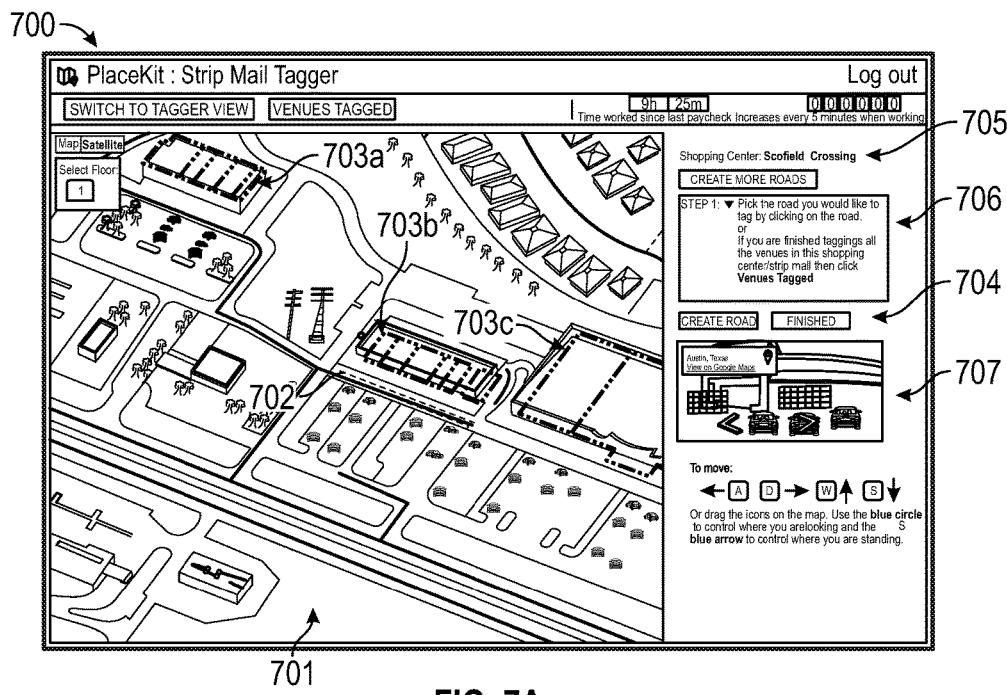
FIGS. 7A-7D are example illustrations associated with a user interface for the example process of FIG. 6.

The process 600 begins by proceeding from beginning step 601 when a tagger logs in to the tagger's account with the location application 340 and initiates the strip mall tagger 416 tool, to step 602 when a two-dimensional image is obtained that provides an aerial perspective of a building that includes a business as provided in the example illustration 700 of FIG. 7A. The strip mall tagger 416 tool relies on an aerial (or "bird's eye") view and satellite imagery to identify, for example, storefronts and entrances for a business instead of different vantage points and triangulation as performed by the venue tagger 412 tool. The strip mall tagger 416 tool assigns to a tagger a particular building or shopping center, such as a strip mall, for which there is limited or no street-level photography available, or is too far away to be used reliably for tagging, due, for example, to the shopping center or other building being set off from a road. The strip mall tagger 416 tool allows for the gathering of storefront and entrance data for locations where there is a lack of street level imagery. For strip malls and other shopping centers where sufficient street level imagery is available, the venue tagger 412 tool can be used.

The example illustration 700 from the strip mall tagger 416 tool includes a photograph 701 taken from an aerial perspective of a shopping center, along with an identification of the name of the shopping center 705, a step-by-step instruction guide 706 instructing the user how to tag a building using the strip mall tagger 416 tool, buttons 704 for creating a road or finishing use of the strip mall tagger 416 tool, and street-level imagery 707 for the shopping center, if available. In the photograph 701, the approximate footprint of the businesses at three different buildings 703a, 703b, and 703b are identified using rectangles overlaid on the photograph 701. The footprint data provided by the mapping database 334 can be obtained from various indoor mapping data sources, and can be useful as a visual cue for the tagger to know where a given business starts and ends as that can be difficult to ascertain purely from street- or aerial-level imagery.

Figure 7B:
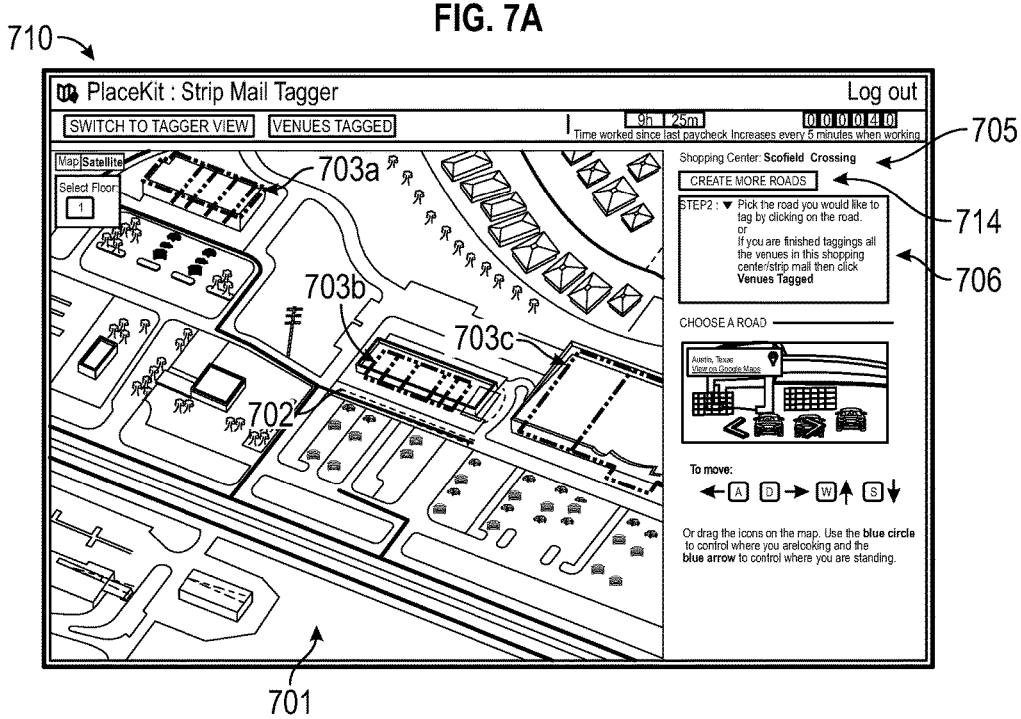

Next, in step 603, a path identifier is received from a user indicating a virtual roadway proximal to the building. The tagger uses the "create road" 704 button to create a virtual road 702 in the aerial photograph 701 of the shopping center. The virtual road is used internally by the disclosed system to ensure parity with data provided by the mapping database 334. For example, because much of the data gathered via the venue tagger 412 tool comes from vehicles driving and gathering street-level imagery, the mapping database 334 includes reference points on the street where the cars were when the street-level images were photographed. Using the strip mall tagger 416 tool, in aspects where there is limited to no street-level imagery for a shopping center identified using the strip mall tagger 416 tool, the strip mall tagger 416 tool mimics a similar format of presentation and processing as the venue tagger 412 tool by having the tagger draw in a virtual road that will be used for creating virtual camera points. After drawing in and creating the roads in step 603, the tagger may select a road to use as the reference point for each of the venues they will tag as provided in the example illustration 710 of FIG. 7B. The virtual camera points will be placed on the selected road to act as the actual camera points gathered by the vehicles that gather the street level imagery used by the venue tagger 412 tool.

Figure 7C:
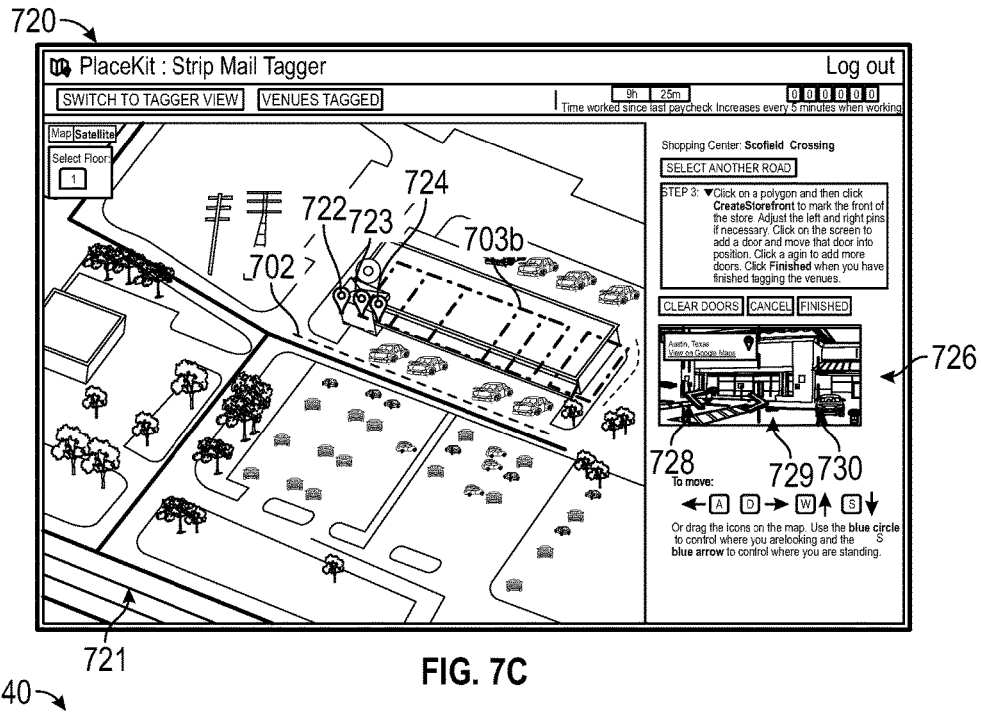

In step 604, a first identifier in the two-dimensional image of a first edge of the business relative to the building, a second identifier of a second edge of the business relative to the building, and a third identifier of an entrance to the business relative to the building are received from the user. Specifically, and as illustrated with reference to the example illustration 720 of FIG. 7C, the tagger identifies the storefront and entrances by clicking on the left side 722, right side 724, and entrance(s) 723 of a business in a similar manner to the venue tagger 412 tool. Unlike the venue tagger 412 tool, however, the strip mall tagger 416 tool displays aerial or satellite imagery for the tagger to tag, and in certain aspects the tagger can adjust the tagged identifications after they have initially tagged them to refine the location of the tag, and the tagger need only tag the locations once.

In step 605 a first latitude and longitude pairing on a map for the first identifier, a second latitude and longitude pairing on the map for the second identifier, and a third latitude and longitude pairing on a map for the third identifier are determined. This may be performed, for example, because each point in the two-dimensional aerial image is associated with a latitude and longitude pairing of a map, and the locations tagged by the tagger on the map for the first, second, and third identifier for the left, right, and entrance(s) of the business, respectively, can be translated directly to latitude and longitude pairings. Thus, unlike the venue tagger 412 tool, there is no need to gather data from multiple vantage points and triangulate the data to determine latitude and longitude pairings.

Finally, in step 606, an identification of the first edge of the business 722 based on the first identifier, an identification of the second edge of the business 724 based on the second identifier, and an identification of the entrance of the business 723 based on the third identifier are provided for display in the two-dimensional image as provided in the example illustration 720, and the process 300 ends in step 607. If street level imagery is available for the business, then a street-level image 726 is provided in the strip mall tagger 416 tool, and an approximation of how the business would look as tagged by the first identifier, second identifier, and third identifier using the venue tagger 412 tool based on the process 600 of FIG. 6 is provided for display.

Figure 7D:
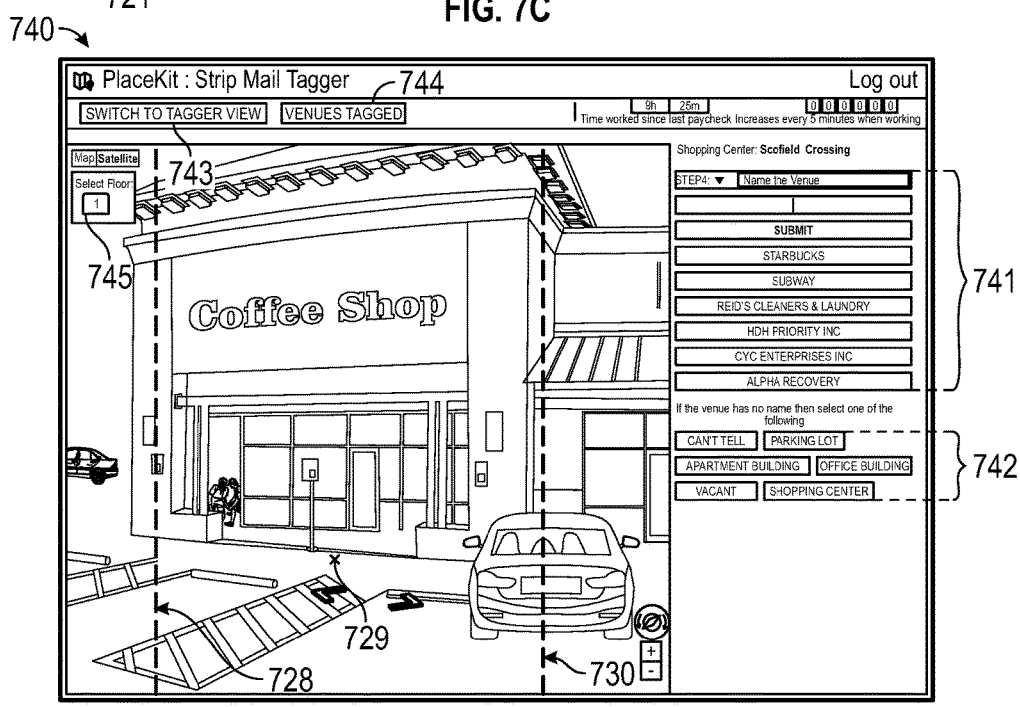

In certain aspects, after the tagger has identified the edges 722 and 724 of a storefront 725 and entrance(s) 723 of a business using the strip mall tagger 416 tool, the tagger is provided with a pane in which to name the business, as provided in the example illustration 740 of FIG. 7D. If street level imagery is available for the business, then a street-level image 728 is provided. The pane is similar to the pane provided for the venue tagger 412 tool, includes an input field in which the tagger can type the name of the venue as well as suggestions for likely names 741, and provides special cases 742 for selection if the business cannot be named.

After selecting the name of a business, information on the business is stored in the mapping database 334. In certain aspects, in order to have parity with the data set generated from the venue tagger 412 tool, the location application 340 is configured to create virtual camera points as discussed previously on the virtual road 702 generated by the user in order to simulate the locations where street-view cameras would have taken photographs making street-level imagery were available. This is accomplished by, for example, selecting two points on the virtual road 702, and, from each point, generating a line that intersects from each point with the respective latitude and longitude pairings determined in step 605. The lines will intersect at the locations identified by the tagger in step 604.

The example illustration 740 of FIG. 7D also includes selectable buttons for the tagger to switch to a tagger view 743, view venues tagged 744, and select a floor 745 for the building being displayed. The switch to tagger view 743 button appears on the toolbar and offers the tagger an ability to open the viewed building or location in the venue tagger 412 tool. This may be useful to the tagger in case street-level imagery exists for part of the building being tagged and it would be better or easier to tag the building using the street-level imagery provided by the venue tagger 412 tool instead of the aerial imagery provided by the strip mall tagger 416 tool.

The venues tagged 744 button when selected by a user will mark the building (e.g., the strip mall or shopping mall being viewed) as having its tagging completed so that it is not assigned to other taggers. The select floor 745 button allows the tagger to change which floor's plan of businesses are illustrated in rectangles 703*a*, 703*b*, and 703*c* in the aerial image 701 and is provided to the tagger because many shopping centers have multiple floors, and sometimes the one visible at street level to be tagged is not the first floor.

Place Tagger

Figure 8A:
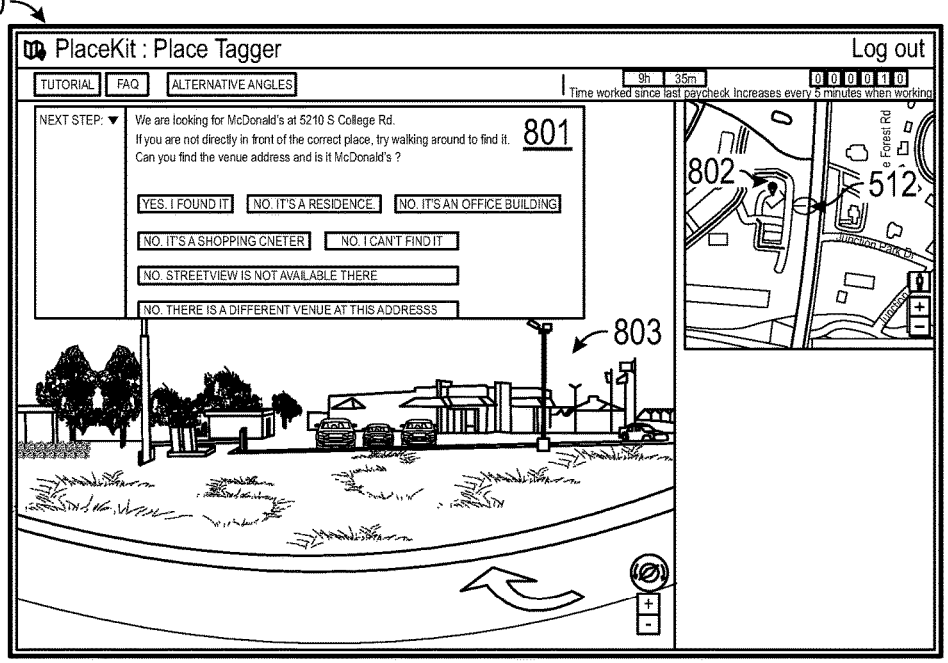
FIGS. 8A and 8B are example illustrations associated with a user interface for permitting a user to identify the location, edges, and physical positions of a pre-selected physical object in a multi-dimensional space.

With reference to the example illustration 800 of FIG. 8A, a graphical user interface for a place tagger 418 tool is provided. Similar to the office building tagger 414 tool, the place tagger 418 tool is another inversion of the venue tagger 412 tool in that rather than the tagger moving up and down a street segment and tagging all businesses on that street segment, the tagger is assigned a business or place to tag and is instructed to find the business or place on the street segment and tag it. The place tagger 418 tool is used to tag locations such as parks, automated teller machines, and to make the mapping database 334 has sufficient coverage of particular businesses, such as restaurant chains. This coverage is to offset the street segment prioritization feature discussed above, which alone may cause a street segment having only one business, such as a particular restaurant, in a sparsely populated area to be given low priority and be unlikely to be assigned to a tagger. It may be of business value, however, to ensure that certain types of establishments, such as the particular restaurant if it is part of a large chain of restaurants, are tagged in the mapping database 334 to ensure sufficient coverage of that chain of restaurants in the mapping database 334. For example, an administrative user may want to ensure we every MCDONALD'S restaurant in the country is tagged in the mapping database 334 and an optimal approach to accomplishing this task may be by use of the place tagger 418 tool to find and tag all MCDONALD'S restaurants, particularly in sparsely populated areas. When a tagger begins use of the place tagger 418 tool, the tagger is provided with a street-level image 803 near where the assigned business is thought to be located (with a visual indicator 802 of the map location provided for display on a map), based on its address, and the tagger is instructed 801 to tag the business once they are able to identify it in the images using the place tagger 418 tool.

Figure 8B:
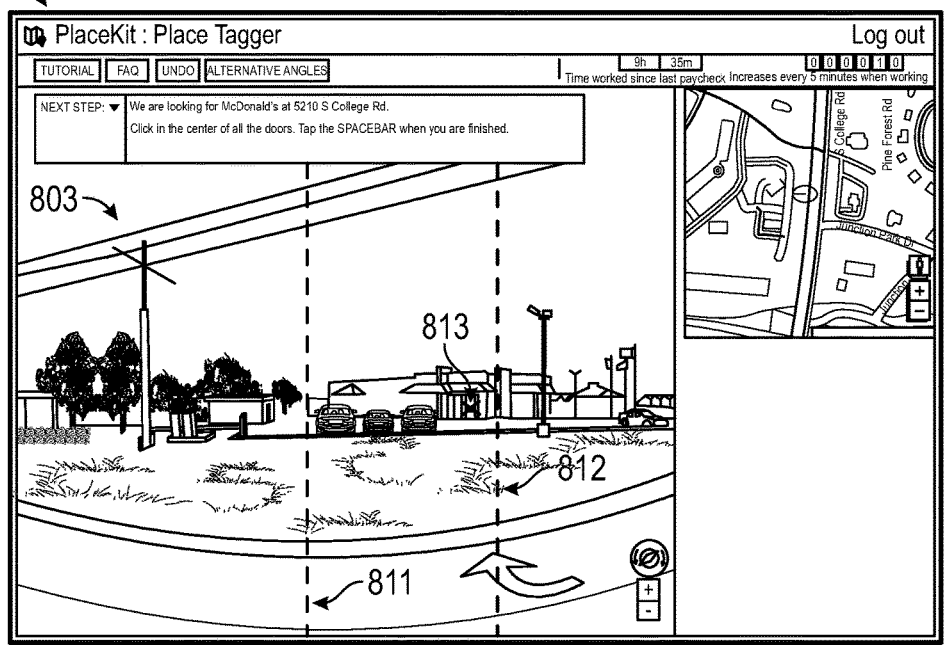

As provided in the example illustration 810 of FIG. 8B, when the tagger finds the assigned business, they may tag the edges 811 and 812 and entrance 813 of a business from two positions using the approach provided in the venue tagger 412 tool. After the business is successfully tagged, another place or business is automatically loaded up for the tagger to find and tag.

Venue Quality Assurance

Figure 9:
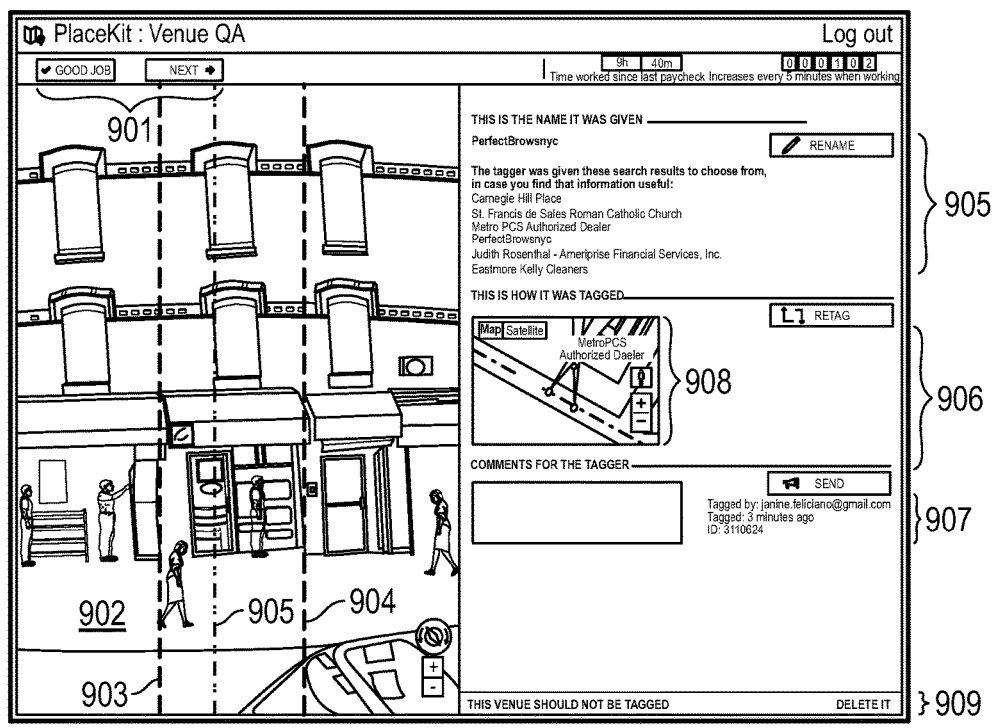
FIG. 9 is an example illustration associated with a user interface for checking the accuracy of the location, edges, and physical positions identified by a user for a physical object in a multi-dimensional space.

The venue quality assurance 422 tool is used for performing quality assurance on venues tagged with the venue tagger 412 tool. The venue quality assurance 422 tool provides a graphical user interface displaying pertinent information about a tagged location, as provided in the example illustration 900 of FIG. 9. The user performing the quality assurance using the venue quality assurance 422 tool or other quality assurance tools, hereinafter referred to as the "QA user", is commonly inspecting the work performed by a tagger.

Provided in the venue quality assurance 422 tool is a toolbar with two buttons 901. The "good job" button is selected by a QA user to indicate that a venue is appropriately tagged. In response, the venue is flagged as appropriately tagged in the mapping database 334 and a different tagged venue is provided for display to the QA user in the venue quality assurance 422 tool for review. The "next" button when selected by the QA user triggers the immediate loading of a different tagged venue for display to the QA user, and presumes that any changes or updates to be made by the QA user have been made.

The street-level image 902 provided for display in the venue quality assurance 422 tool displays to the QA user how a venue was tagged by a tagger, including the identification of edges 903 and 904 of a venue and the entrance(s) 905 of the venue. The QA user is asked to ensure that the edges 903 and 904 of the venue left and right side are properly tagged and that the dotted lines for an entrance 905 pass through the center of an entrance. If the QA user finds that the tagging performed for a venue appears incorrect, the user can use a "retag" button 906 to more accurately tag the venue.

The venue quality assurance 422 tool includes an interface 905 for reviewing the name a venue was given as well as the suggestions the tagger was provided with when the tagger tagged the venue. This provides the QA user with an opportunity to quickly evaluate whether the tagger chose the correct name for the venue. If the name does not appear correctly chosen, the QA user is able to rename the venue in the interface 905, which will update the record in the mapping database 334 with the updated name provided by the QA user.

The venue quality assurance 422 tool also includes an interface 906 for reviewing how a venue was tagged by a tagger. The interface 906 includes an overhead map view of the tagged area, a visual indication of each camera point from which the venue was tagged as dots on the road, the storefront as a line (e.g., a green line), and each entrance that was tagged as a dot (e.g., a green dot). The QA user can click on the camera dots and the street-level image 902 will be updated to show the tags from that selected perspective of the camera.

The venue quality assurance 422 tool further includes an interface 907 for permitting the QA user to provide comments to the tagger to, for example, communicate to the tagger immediately in a pane in the tagger's use of the venue tagger 412 tool or other tool where the tagger is able to view the comments. This is helpful in situations where, for example, a new tagger tags a venue but fails to tag the entrances. The QA user can remind the new tagger that they must tag the entrances and they will immediately see that message along with the tag identified by the QA user that did not include the tagging of an entrance. As such, this venue quality assurance 422 tool and the other quality assurance tools 424, 426, and 428 serve several purposes, including ensuring data in the mapping database 334 is accurate and viewed by two different users, provide immediate feedback to taggers to ensure the taggers learn from their mistakes early on, and provide statistics on how many tags of a tagger are correct or incorrect, which can be used in the tagger management 432 tool to determine the efficacy of each tagger.

The venue quality assurance 422 tool yet further includes an interface 909 for a QA user to delete a venue that was tagged but should be deleted (e.g., if the venue tagging was incorrect). This is useful in cases where, for example, a tagger tags something like a private residence, which in certain aspects is not data stored in the mapping database 334, or some other location (e.g., a portable toilet, shed, garage, or other non-venue structure) that should not have been tagged as a venue.

Street Quality Assurance

Figure 10A:
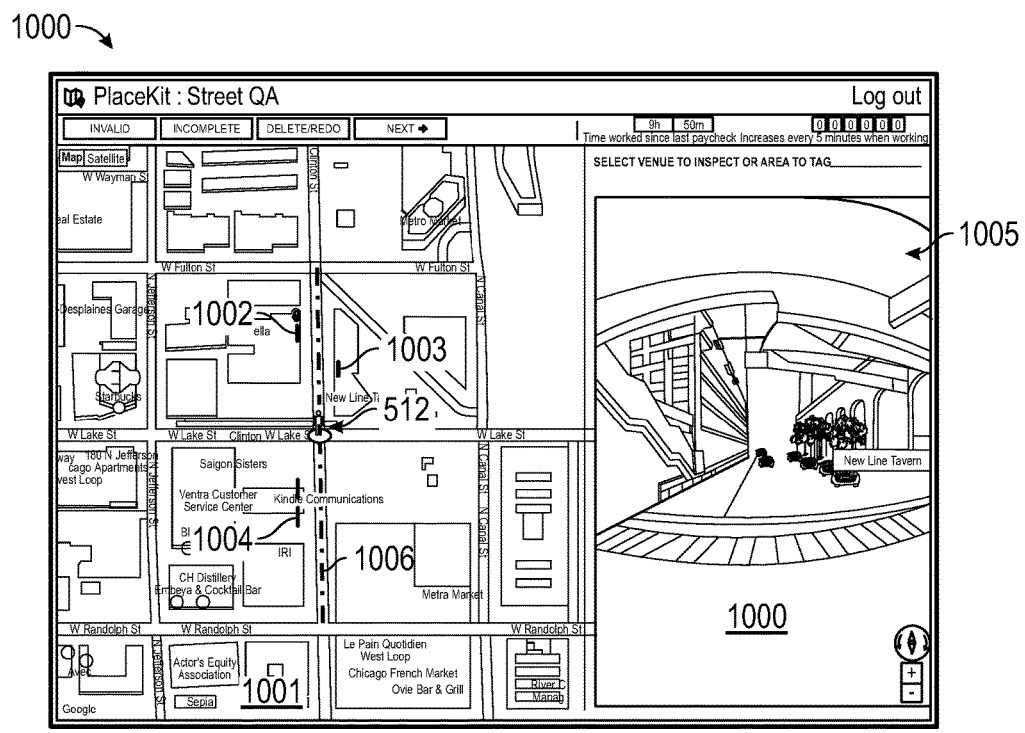
FIGS. 10A and 10B are example illustrations associated with a user interface for checking the accuracy of the location, edges, and physical positions determined for multiple physical objects along a street in a multi-dimensional space.
Figure 10B:
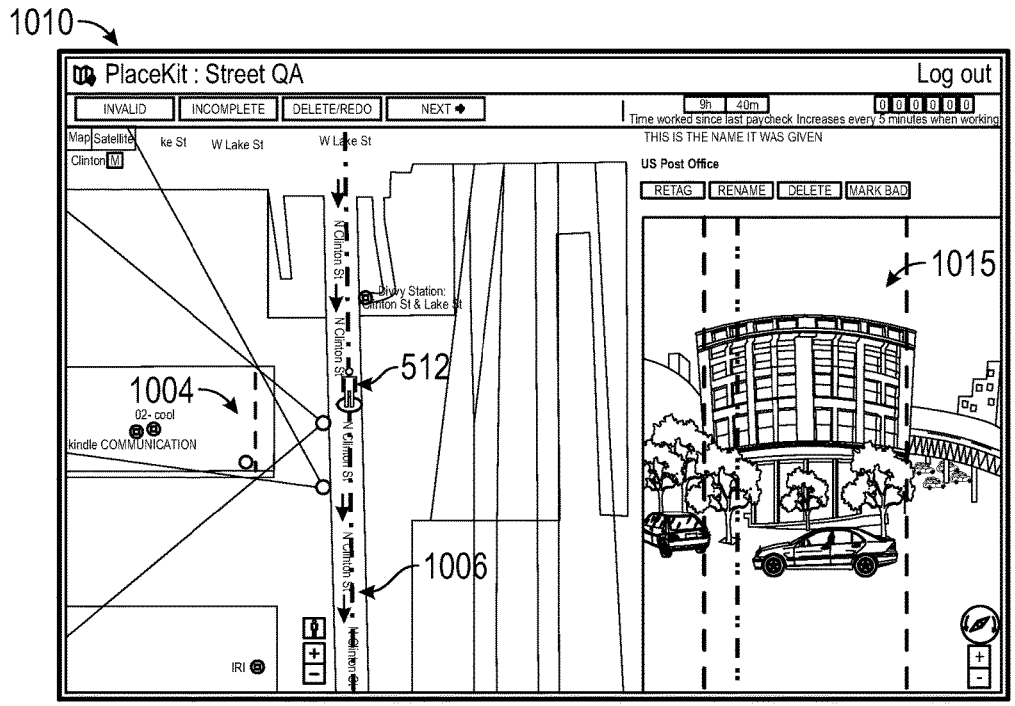

The street quality assurance 424 tool is used by a QA user to view and perform quality assurance on an entire street segment. The QA user is provided with a street segment within the street quality assurance 424 tool that was marked as finished by a tagger and the QA user is instructed to determine whether each venue on the street segment has been tagged. As provided in the example illustration 1000 of FIG. 10A, a large map 1001 is displayed with an overview of the street segment 1006 to which the tagger was assigned as indicated by a line (e.g., red line) on the map 1001. As provided in the example illustration 1010 of FIG. 10B, each of the venues 1002, 1003, and 1004 the tagger has tagged appear on the map as lines (e.g., green lines) and/or dots with the line representing the storefront (left side to right side) and the dots representing the entrances. The QA user can move the person icon 512 to a new location and the street level imagery 4005 will be updated to show a street-level view of the street segment from the new location. The QA user can also select any tag for a business to see the positions of the cameras for the street-level imagery for the business. That street-level imagery is updated to show the tagged sides and entrance(s) of the business. The QA user can further view and/or select any of the black dots on the map 1001 indicating a camera point from which to view a tag. The QA user can also view a name given to a venue and select options to retag, rename, delete, or "mark bad" a tag associated with a venue.

In certain aspects, when a QA user is using the street quality assurance 434 tool each venue has likely been reviewed using the venue quality assurance 422 tool so most venues need not undergo individual quality assurance using the street quality assurance 424 tool, and as such one focus of the street quality assurance 424 tool is to ensure that a street segment as a whole is adequately tagged by inspecting attributes of the locations on the street segment that have already been tagged. The street quality assurance 434 tool includes several selectable buttons in a toolbar, including an "invalid" button for flagging a currently displayed street segment as invalid indicating there are no venues on the street segment or that sufficient street-level imagery for the street segment is not available. The "incomplete" button is used for flagging a currently displayed street segment as incomplete, placing the street segment back into the pool to be assigned to another tagger. The "delete/redo" button is used by a QA user to delete all venues on the currently displayed street segment and put the street segment back into the pool to be assigned to another tagger. The "delete/redo" button is used sparingly, and is helpful in situations where a new tagger may have incorrectly tagged an entire street segment. The "next" button is used to flag a currently displayed street segment as having undergone successful quality assurance. Selection of any of these four buttons will trigger the selection of another street segment from a queue in order to undergo quality assurance.

Venue Live

Figure 11:
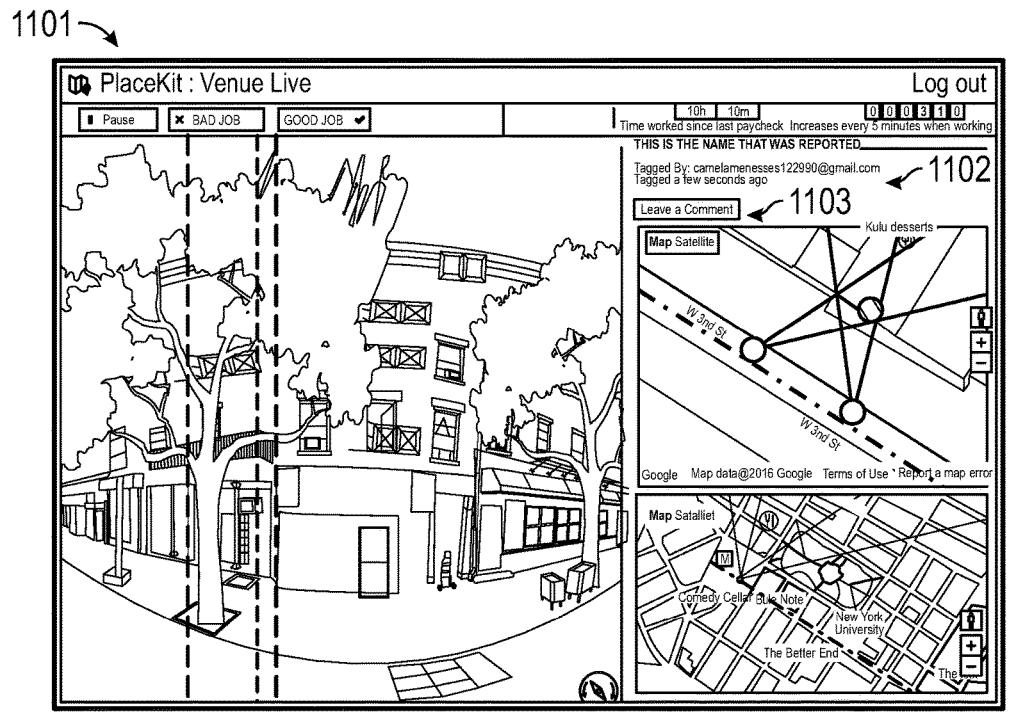
FIG. 11 is an example illustrations associated with a user interface for permitting a first user to view a remote second user identify the location, edges, and physical positions of a pre-selected physical object in a multi-dimensional space.

The venue live 426 tool is provided as a graphical user interface that is updated to display imagery and maps of the most recent venue tagged by any tagger, and as such, may switch between the display of different venues rapidly during periods of high active tagging. As provided in the example illustration 1100 of FIG. 11, the QA user engaged with the venue live 426 tool may therefore watch as different venues are tagged by an identified tagger 1102 and pause the interface using a toolbar 1101 when a tagged venue needs attention or correction. The venue live 426 tool permits the QA user to provide feedback to a tagger using a comment field 1103. As with the other QA tools 422, 424, and 428 disclosed herein, the QA user can click on the displayed dots on the map to switch camera viewpoints and see the street-level photograph associated with the dots of what the tagger viewed as the tagger tagged from each location indicated by the dots.

Street Live

Figure 12:
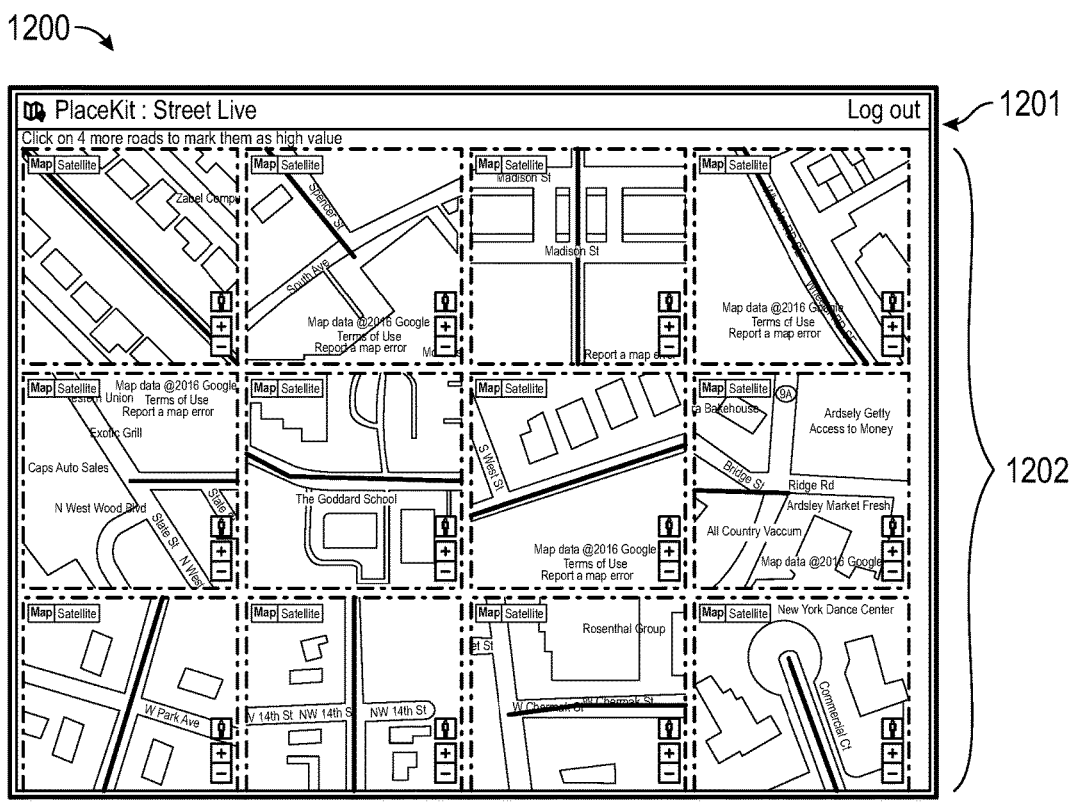
FIG. 12 is an example illustration associated with a user interface for permitting a user to adjust the priority in which a street having physical objects alongside it is selected for identification of the location, edges, and physical positions of the physical objects.

The street live 428 tool is provided as a graphical user interface that is used to facilitate the review and quality of street segment prioritization. As provided in the example illustration 1200 of FIG. 12, the street live 428 provides for display maps of a series of street segments 1202 about to be assigned to a tagger, and instructs 1201 a QA user to select a certain number of those displayed street segments (e.g., one-third of the displayed street segments) to be further prioritized for assignment. For example, if a QA user identifies a street segment with a lot of venues, the QA user can select that street segment to increase its priority for assignment to a tagger. The selected street segments can have their prioritization increased in the mapping database 334 making them more likely to be assigned to a tagger, and the unselected street segments can have their prioritization decreased in the mapping database 334. In certain aspects where the location application 340 identifies street segments with a high concentration of venues, but certain of those venues are not facing the street segment (e.g., alleys, side streets, and other streets which are near venues but do not have any actual venues on them), the street live 428 tool permits for correction of those errors.

Tagger Management

Figure 13A:
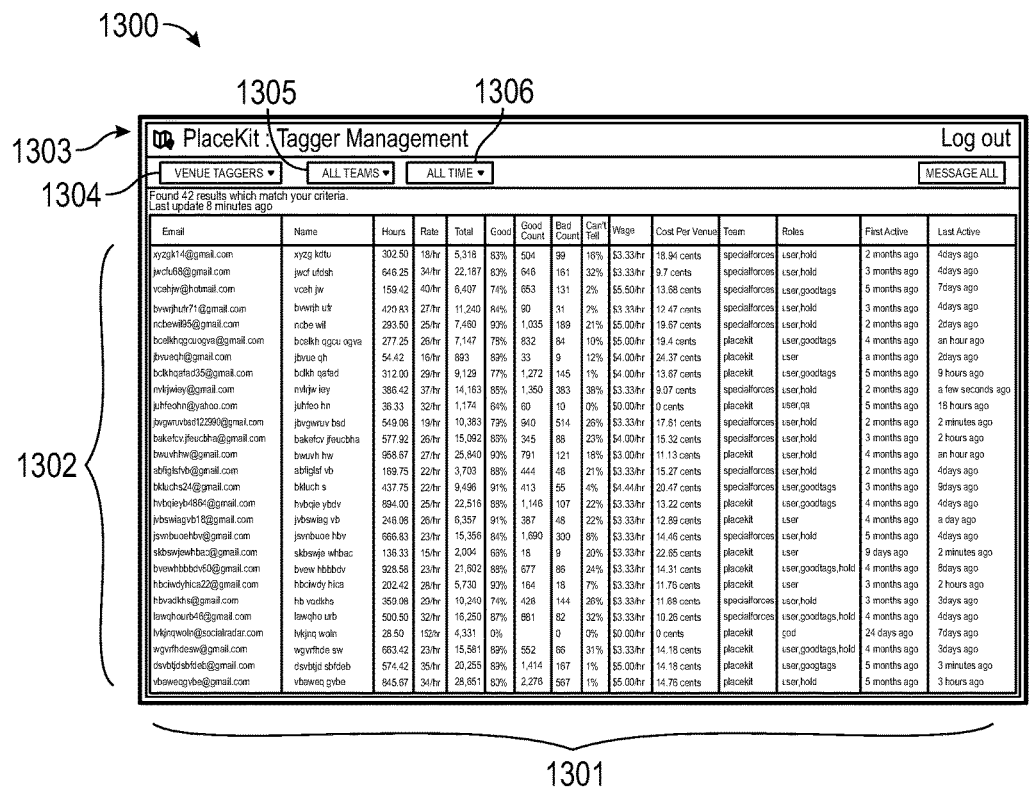
FIGS. 13A-G are example illustrations associated with a user interface for managing users performing identifications of the location, edges, and physical positions of physical objects in a multi-dimensional space.
Figure 13B:
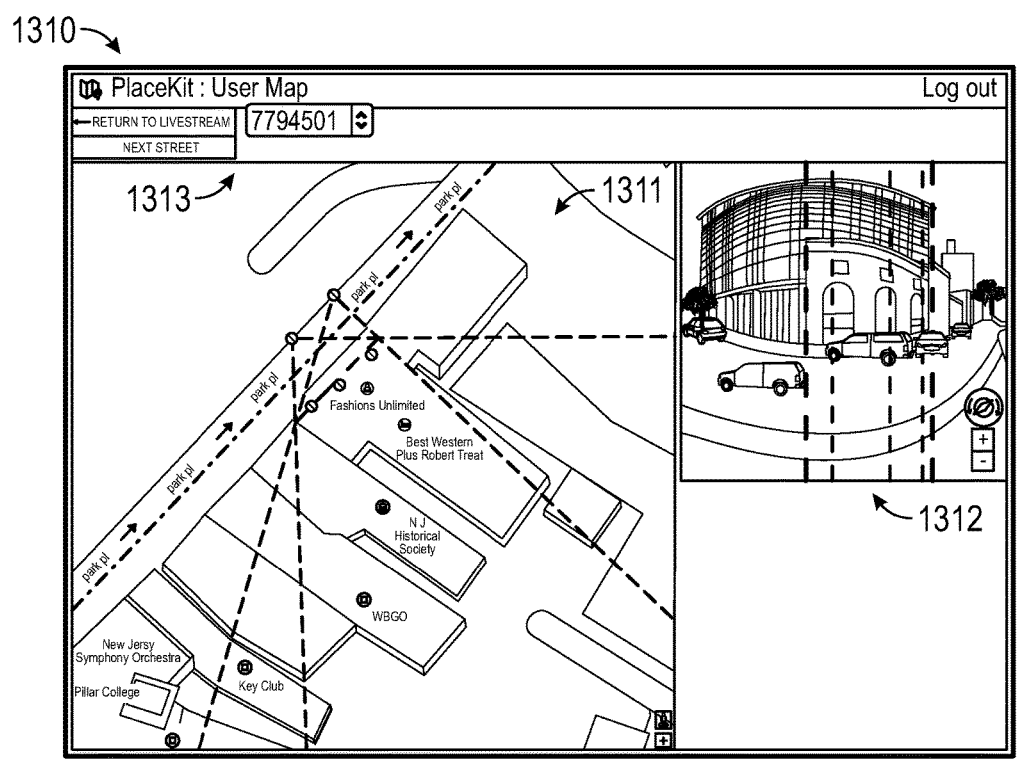

The tagger management 432 tool is one of several management tools 430 provided in the dashboard 410 for the location application 340, and permits an administrative user to manage various settings associated with the accounts of taggers and QA users for the disclosed system, and view metrics on the taggers and QA users. The tagger management 432 tool includes a tagger management table that includes a listing 1302 of taggers and QA users organized by various parameters 1301. If an administrative user selects an email parameter for one of the taggers or QA users, a new browser tab may be displayed in the browser application 322 providing a user map for display, as provided in the example illustration 1310 of FIG. 13B. The user map includes a view, on a map 1311, of each of the street segments the selected tagger has been assigned, thereby permitting an opportunity for the tagger to be reviewed. A selected location on the map 1311 can trigger the display of an associated street-level view 1312 of a tagged venue.

Figure 13C:
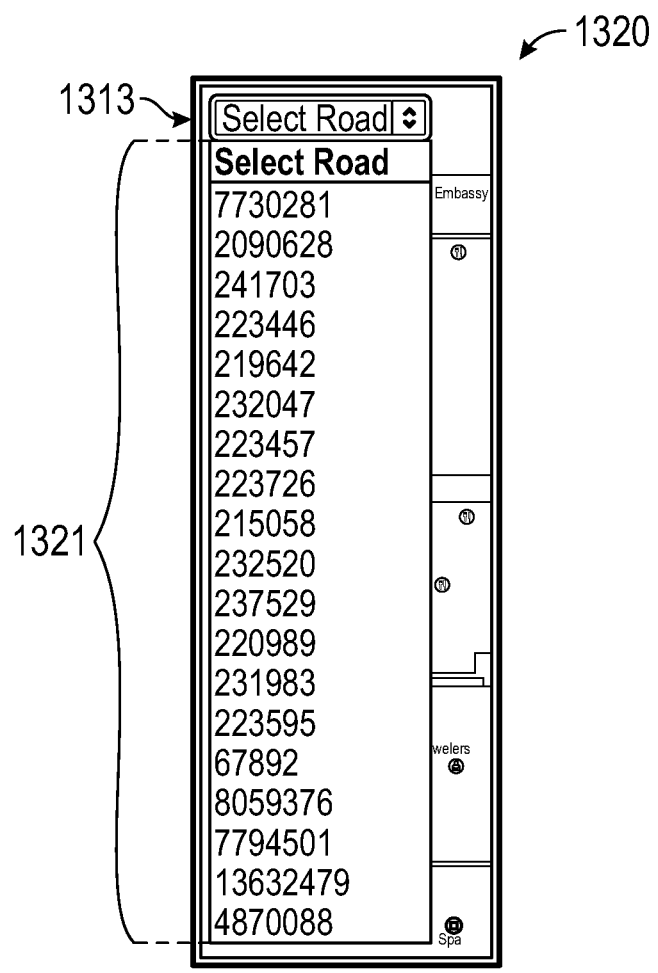

As provided for display in greater detail in the example illustration 1320 of FIG. 13C, a dropdown menu 1313 is provided in the tagger management 432 tool that allows the administrative user to select a street segment and as each street segment is selected, the selected street segment is shown on the map 1311 along with each of the venues which were tagged on that street segment.

Figure 13D:
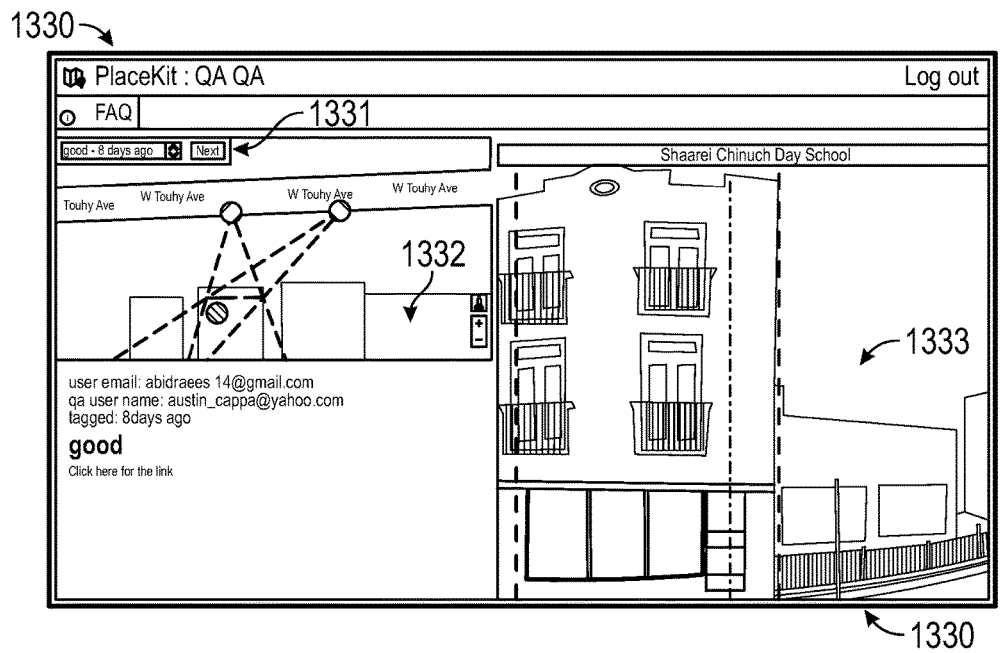

Included in the listing 1302 of the tagger management table is the good count, bad count, and "can't tell" percentage for each tagger, which when selected displays a webpage where the administrative user can see each of the tags within that category that the tagger created. For example, as provided for display in greater detail in the example illustration 1330 of FIG. 13D, by selecting the a value in the Good Count parameter column in a row for a tagger, the administrative user will be provided with a web page displaying a map 1332 and associated street-view imagery 1333 for each of the tags the tagger has done that a QA user has marked as "good." The web page includes a dropdown menu 1331 so the administrative user can go through and view each of the tags the tagger has tagged.

Similarly, by selecting the a value in the Bad Count parameter column of the tagger management table in a row for a tagger, the administrative user will be provided with a similar web page where the administrative user can view each of the tags that a QA user has marked as "bad" for the tagger. By selecting the "Can't Tell" value in the parameter column of the tagger management table in a row for a tagger, the administrative user will be provided with a web page identifying all tags where the selected tagger has marked the name of the venue as "Can't Tell." This is a special option in the naming pane which has proved helpful to identify taggers that have likely improperly overused the ability to indicate that a name of a venue cannot be identified from an image.

The rate and cost per venue parameters in the tagger management table for a tagger displayed in the illustration 1300 are critical metrics for determining tagger efficiency. The rate parameter indicates a tagger's average rate, per hour, of tagging venues. The higher the rate, the more rapidly the tagger is tagging venues. The cost per venue parameter indicates a tagger's hourly wage divided by their rate. By identifying how much a tagger is being paid per venue with the tagger's wage and their rate of tagging venues, a financial determination can be made regarding a tagger's efficiency. A tagger with a very high rate and a high hourly wage is often comparable to a tagger with a far lower rate and a lower hourly wage.

Figures 13E, 13F:
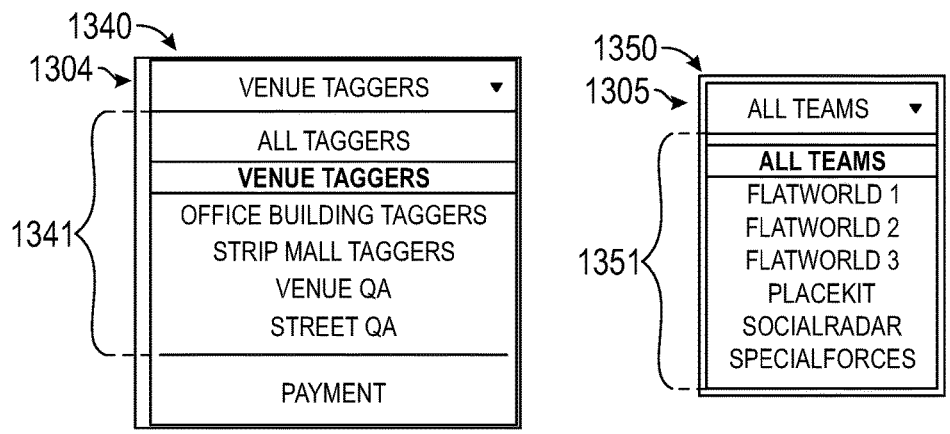
Figure 13G:
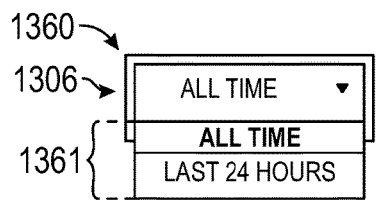

The tagger management 432 includes a dropdown menu 1304 in the toolbar to switch the view seen by the administrative user. For example, as illustrated in the example illustration 1340 of FIG. 13A, the administrative user can switch between the statistics for different listed views 1341. Each of the web pages associated with a selected view 1341 is very similar to the venue taggers view illustrated in FIG. 13A, but includes relevant statistics for each view. The administrative user can also filter each view by team 1305 (e.g., by way of listed teams 1350) and/or time 1306 (e.g., according to various time segments 1361), as provided in the example illustrations 1350 and 1360 of FIGS. 13F and 13G, respectively.

Although not displayed, the location application 340 includes an integrated messaging system throughout the disclosed tools that permits administrative users to send messages to the taggers and QA users. For example, from the tagger management 432 tool, an administrative user can send a direct message to a single tagger or a broadcast message to all taggers. The taggers will see these messages in their display in the location application 340 in real-time, and in certain aspects, the taggers must acknowledge the received message before continuing their work.

System Admin

Figure 14A:
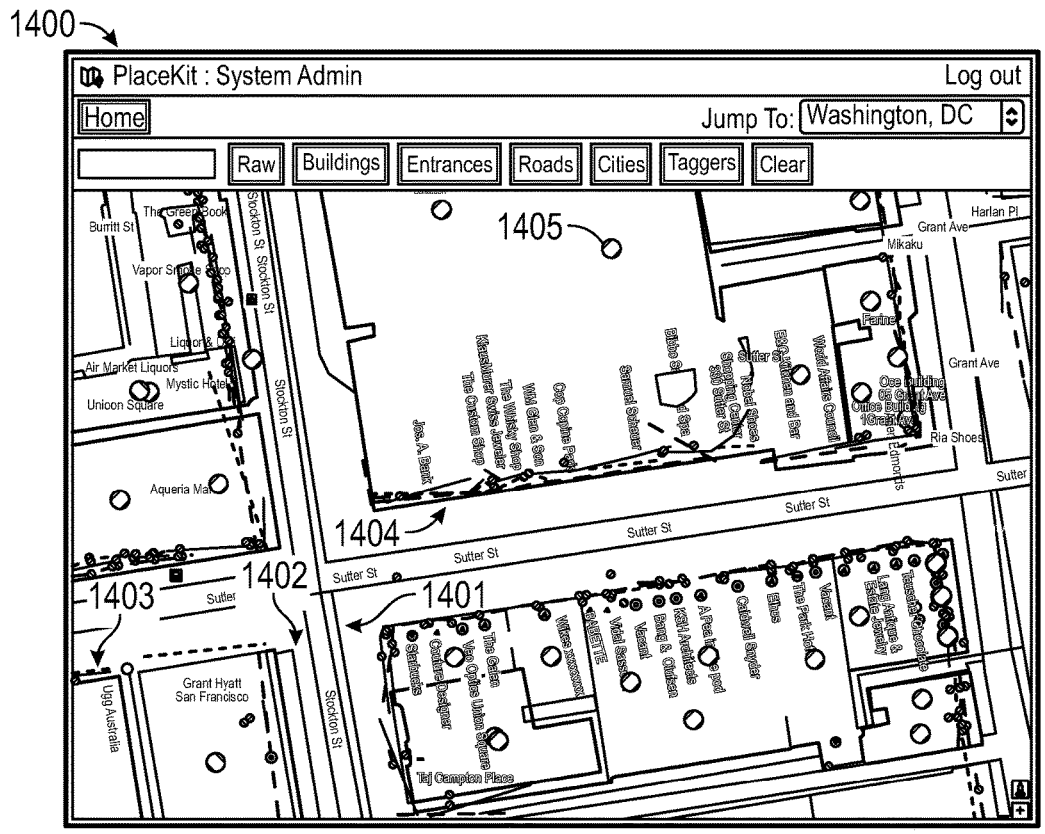
FIGS. 14A-H are example illustrations associated with a user interface for administering data related to the identifications of the location, edges, and physical positions of physical objects in a multi-dimensional space.
Figure 14B:
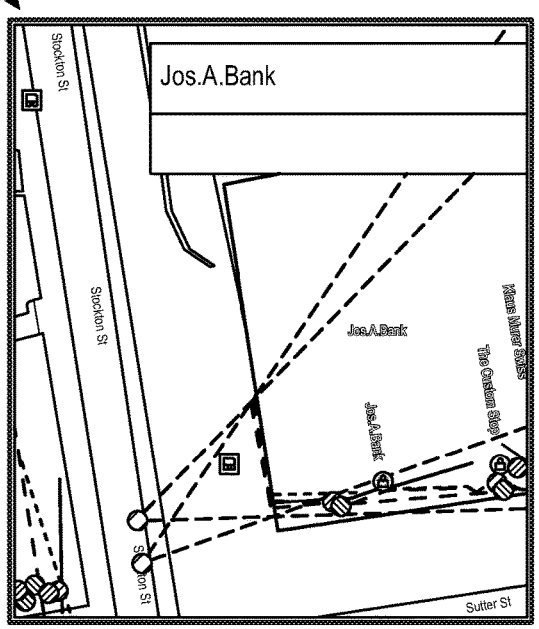
Figure 14C:
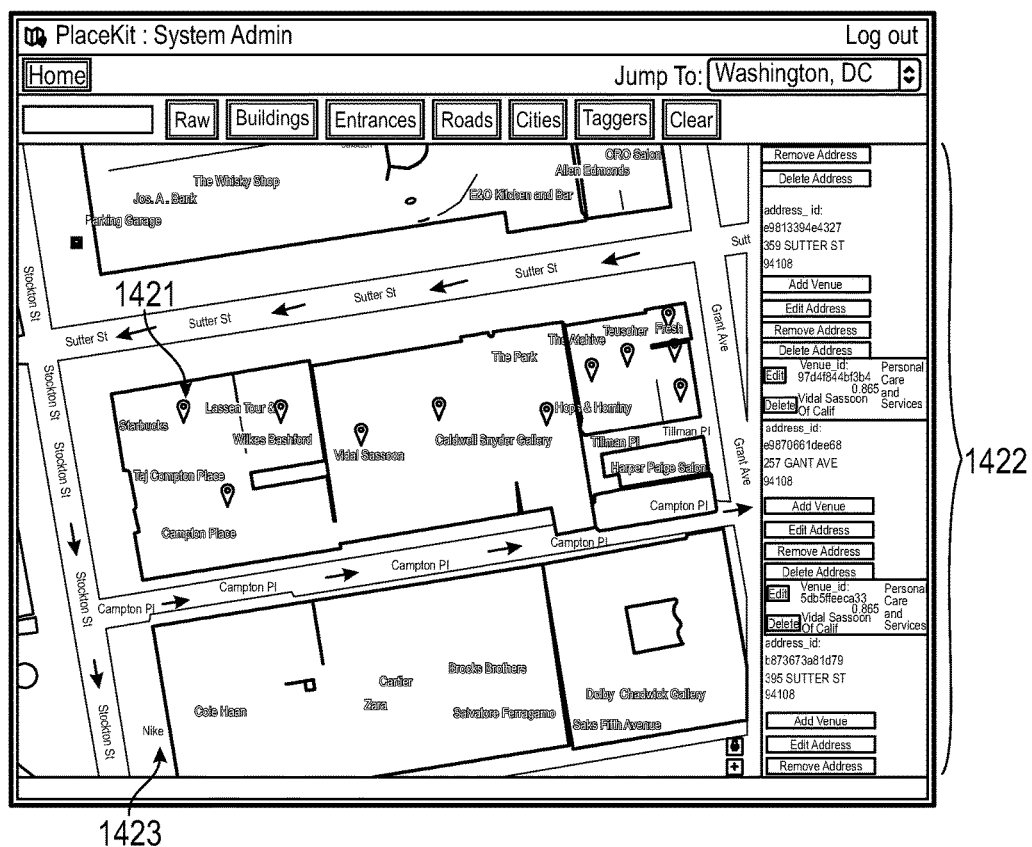
Figure 14D:
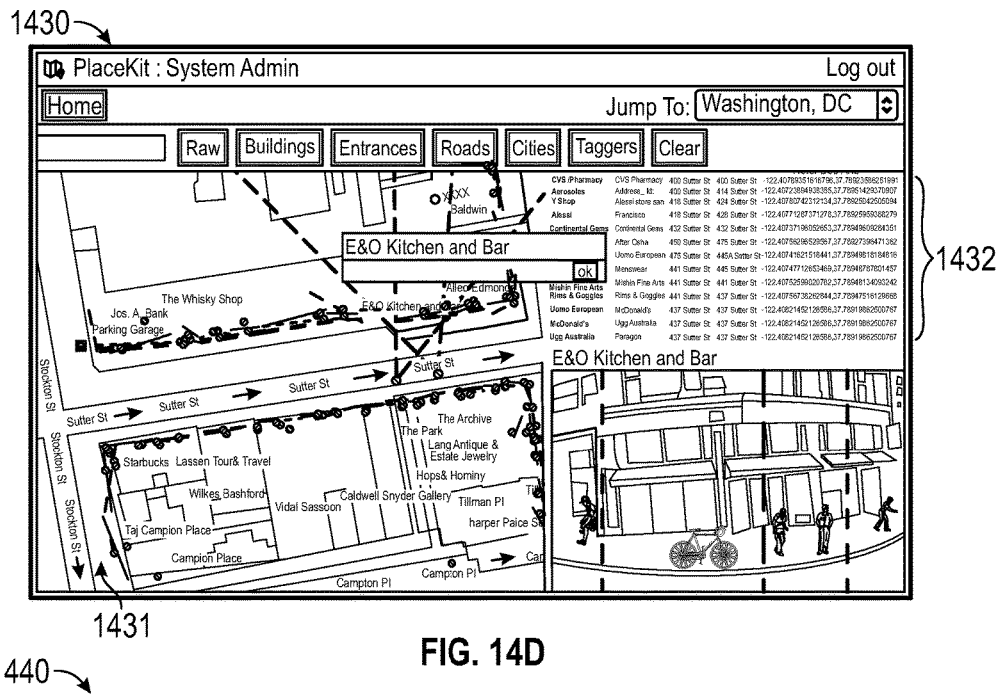
Figure 14E:
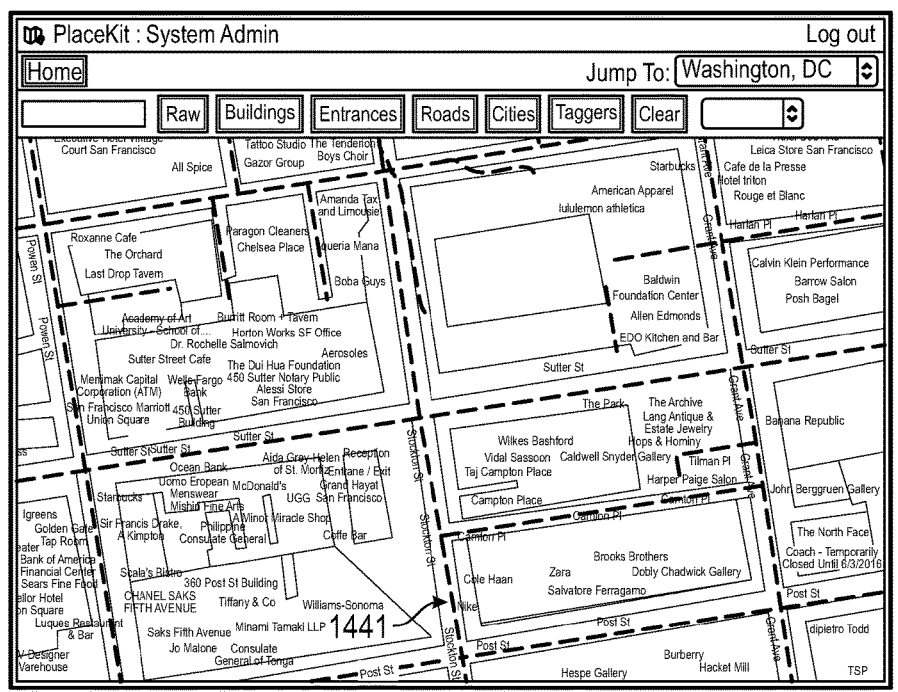
Figure 14F:
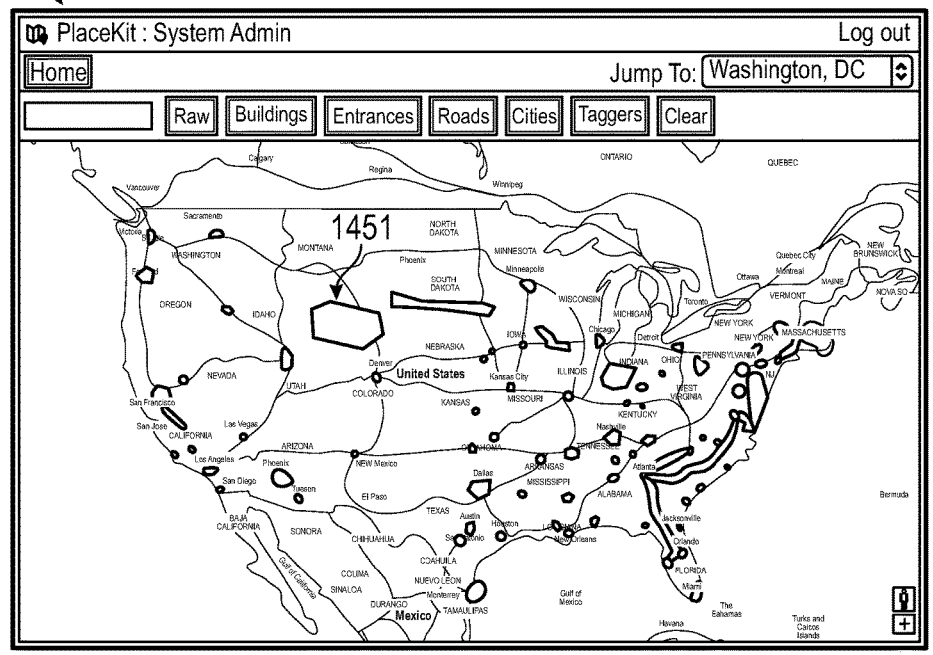
Figure 14G:
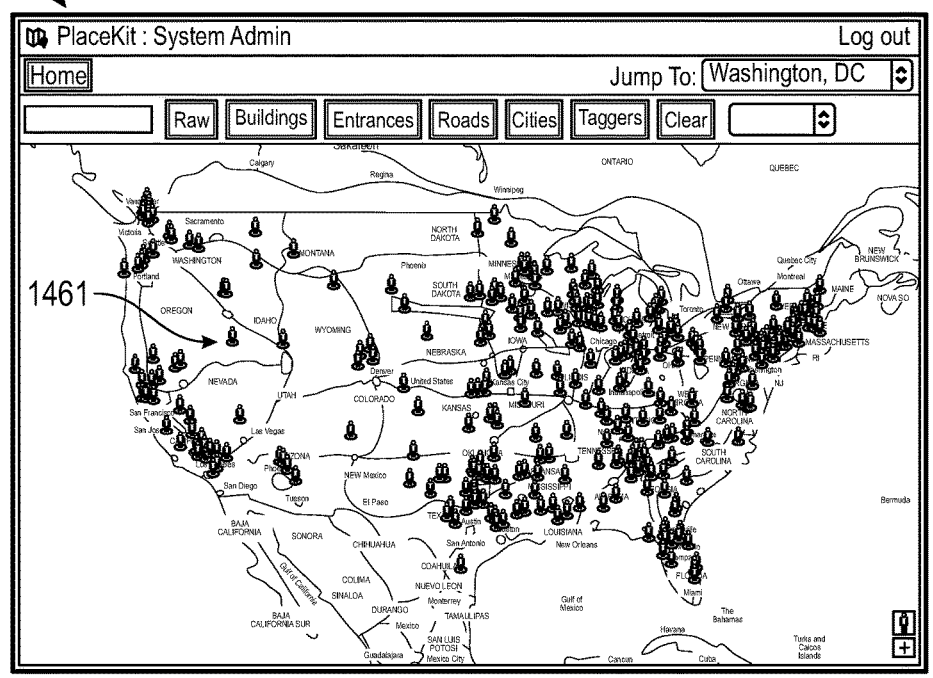

The system admin 434 tool is a backend tool to administer data stored in the mapping database 334. The system admin 434 tool permits an administrative user to view raw data stored in the mapping database 334, including adding, editing, and removing any of the data. The system admin 434 tool permits an administrative user to view data stored in the mapping database 334 in at least six different ways: a raw view (illustration 1400 of FIG. 14A), a buildings view (illustration 1420 of FIG. 14C), an entrances view (illustration 1430 of FIG. 14D), a roads view (illustration 1440 of FIG. 14E), a cities view (illustration 1450 of FIG. 14F), and a taggers view (illustration 1460 of FIG. 14G).

As provided in the illustration 1400 of the raw view, a map is provided for display identifying, in certain aspects, all location data for the mapped area stored in the mapping database 334, including street segments 1401, building polygons 1402, parcel polygons 1403, address points (illustrated as dots 1405), and tagged venues 1404. An administrative user can click on any of the tagged venues to see the images for the points from which the tag was generated by a tagger along with the name of the venue to which the tag refers. This functionality is similar to the functionality available in the venue quality assurance 422 tool, but for any tag done by any user of the location application 340. The location application 340 provides in the system admin 434 tool an extensive right click menu that allows for many administrative tasks such as adding parcel polygons, building polygons, cities for prioritization, using the venue tagger 412 tool at a selected location, using the strip mall tagger 416 tool at a selected location. As provided in the example illustration 1410 of FIG. 14B, for each of the polygon tasks, in certain aspects there is a second task where an administrative user can draw polygons on a map and the drawn polygons can be stored in the mapping database 334.

As provided in the illustration 1420 of the buildings view, a map is provided for display identifying buildings identified in the mapping database 334. An administrative user can view attributes about each building by, for example, right clicking on a building polygon or indicator 1421 and choosing it to inspect the data, in response to which each address associated with that building along with the venues associated with that address are provided for display in a panel 1422. The administrative user can add venues, remove or edit addresses, remove or add buildings, among other features from the panel 1422.

As provided in the illustration 1430 of the entrances view, a map 1431 is provided for display that identifies entrance data from the mapping database 334. An entrance on the map can be selected by an administrative user to view the street-level imagery viewed by the tagger to identify the entrance. Additionally, a right pane 1432 is provided for display to the administrative user so that the administrative user can view a list of all tagged storefronts and entrances loaded on the map 1431 and can select a storefront to view particulars of the selected venue.

As provided in the illustration 1440 of the roads view, a map is provided for display identifying all street segments 1441 identified within the displayed map.

As provided in the illustration 1450 of the cities view, a map is provided for display identifying cities in which taggers are to receive street segments that have prioritized for tagging. Specifically, an administrative user can draw a line around a city in the displayed map and in certain aspects all of the street segments within the bounded city area would have their street segment priority value increased.

Figure 14H:
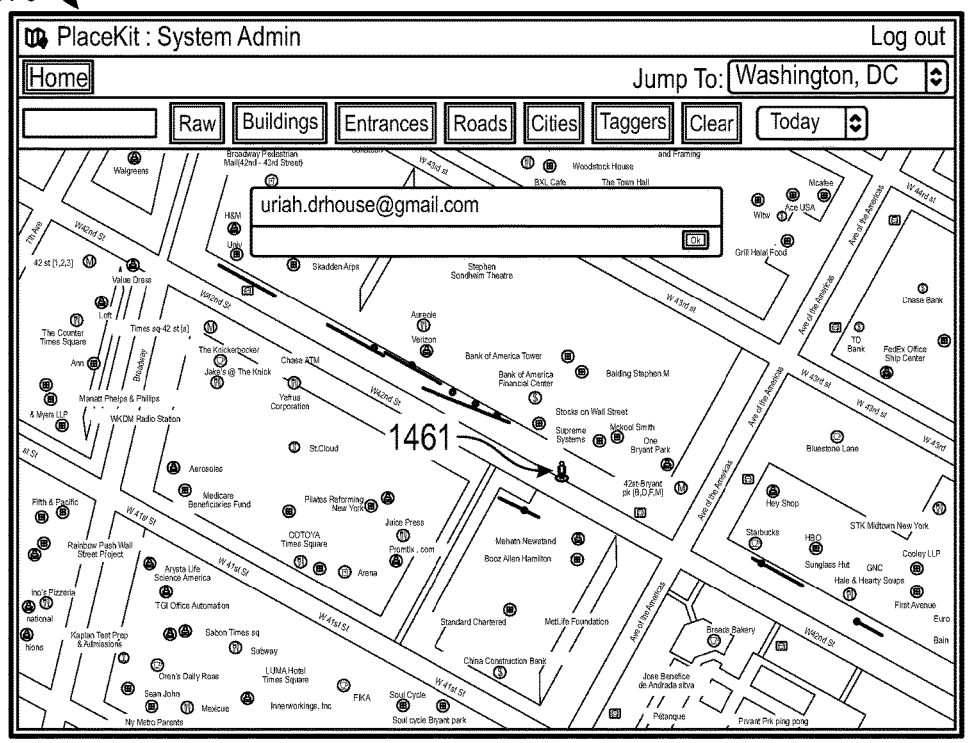

As provided in the illustration 1460 of the taggers view, a map is provided for display permitting an administrative user to see the most recent locations in which a tagger 1461 has tagged a location. The administrative user can, for example, either view the last location a tagger tagged at any time, or the most recent location taggers have tagged in the last twenty four hours. By selecting a tagger 1461, the administrative user can be provided with a display in which the administrative user can view the most recent (e.g., 100 most recent) tags by the selected tagger 1461 loaded for display on a map, and provided in the example illustration 1470 of FIG. 14H.

Metrics

Figure 15A:
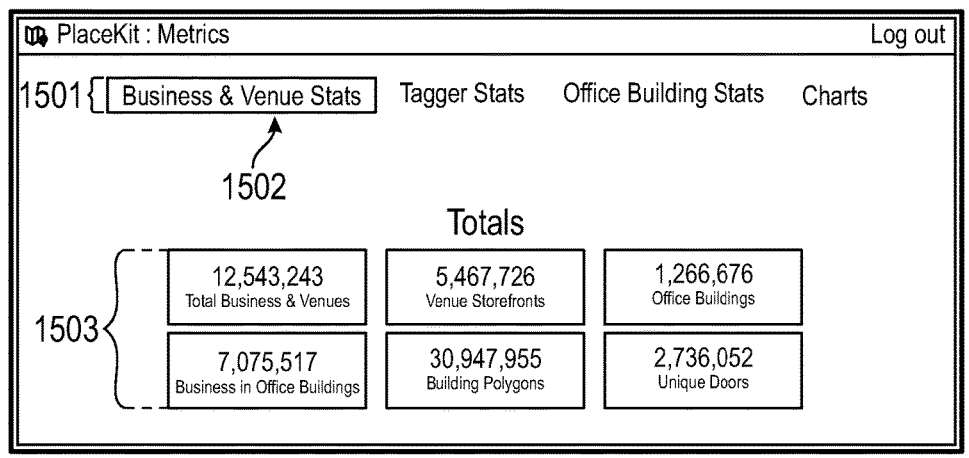
FIGS. 15A-D are example illustrations associated with a user interface for viewing metrics related to the identifications of the location, edges, and physical positions of physical objects in a multi-dimensional space.
Figure 15B:
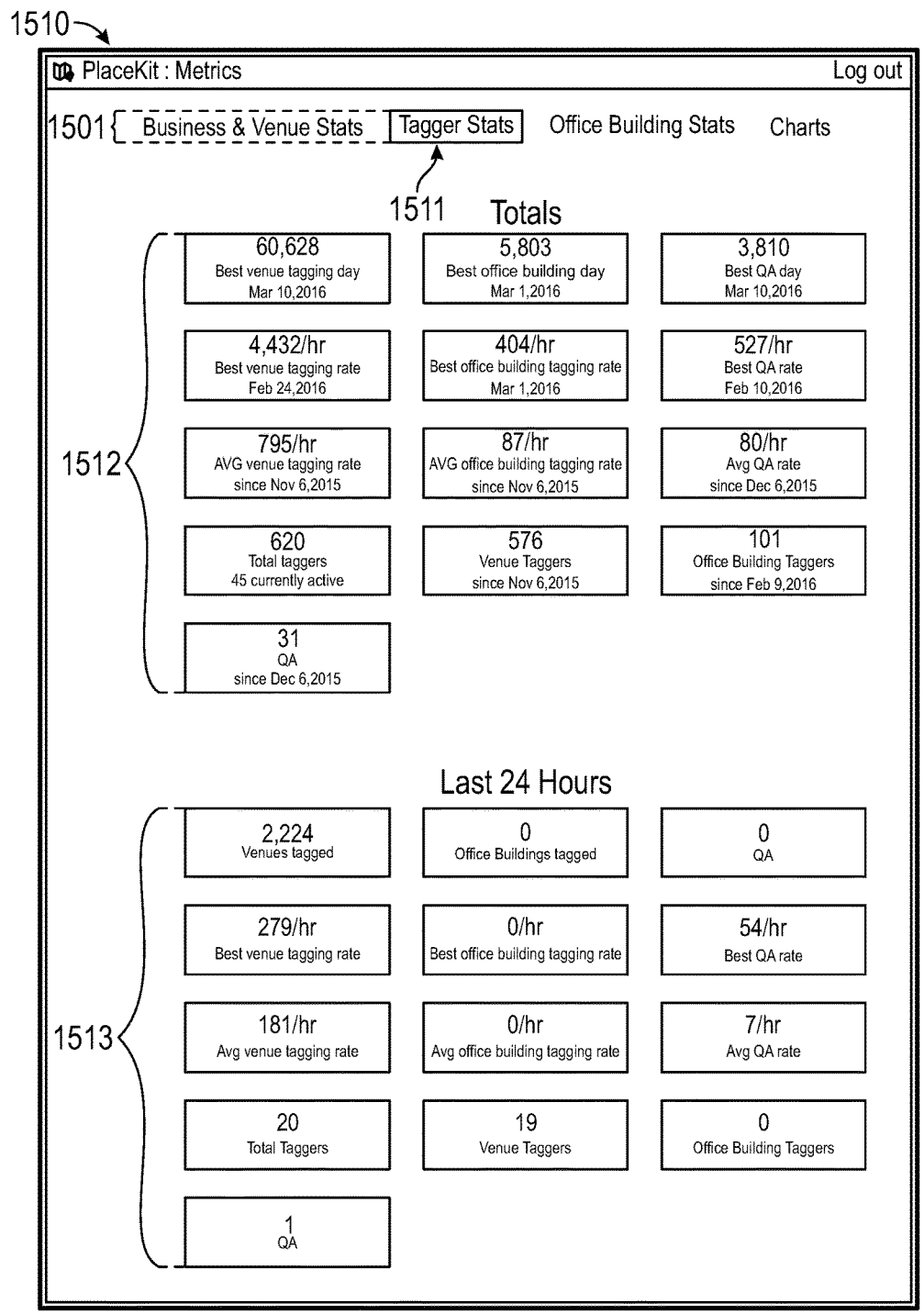
Figure 15C:
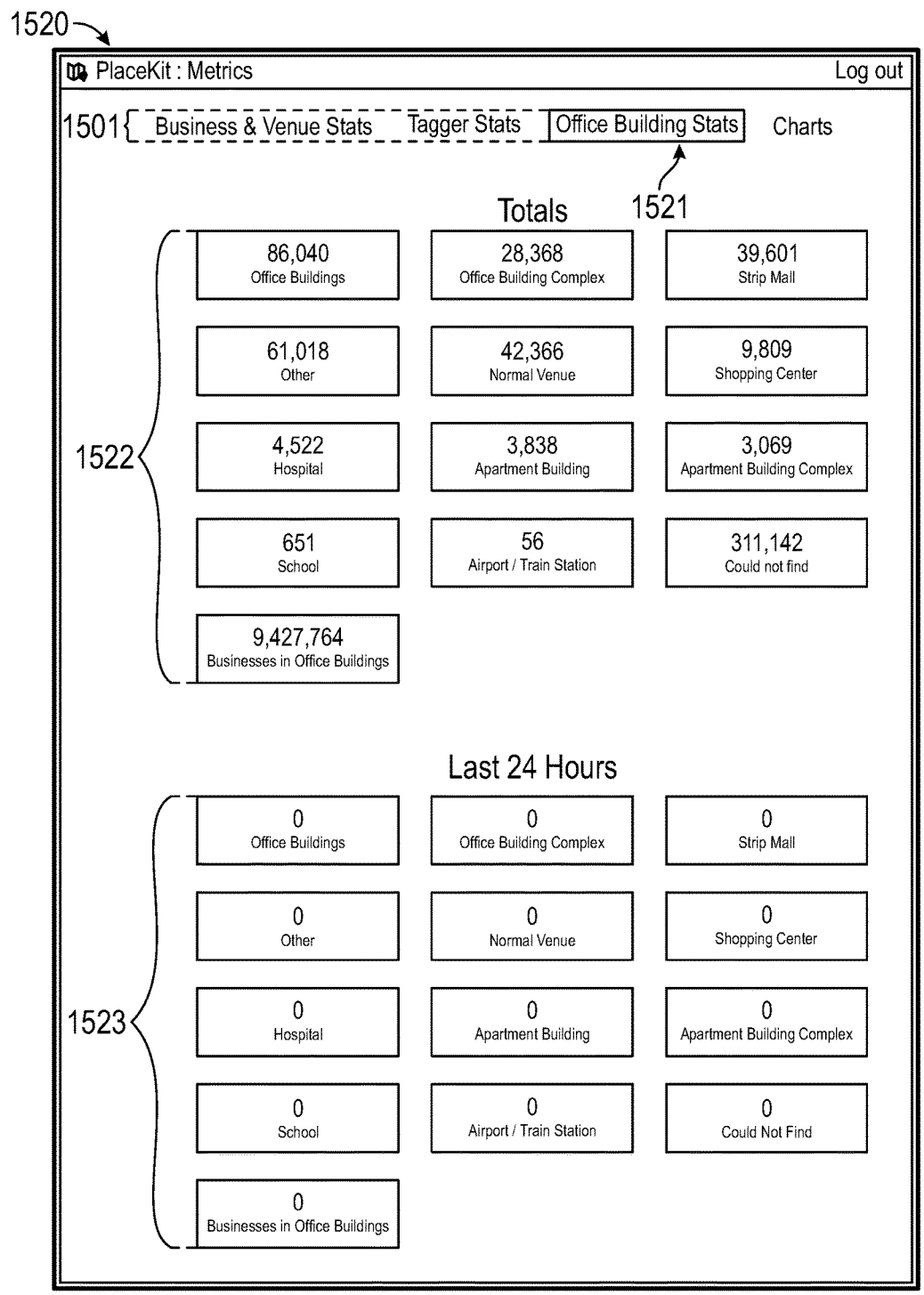
Figure 15D:
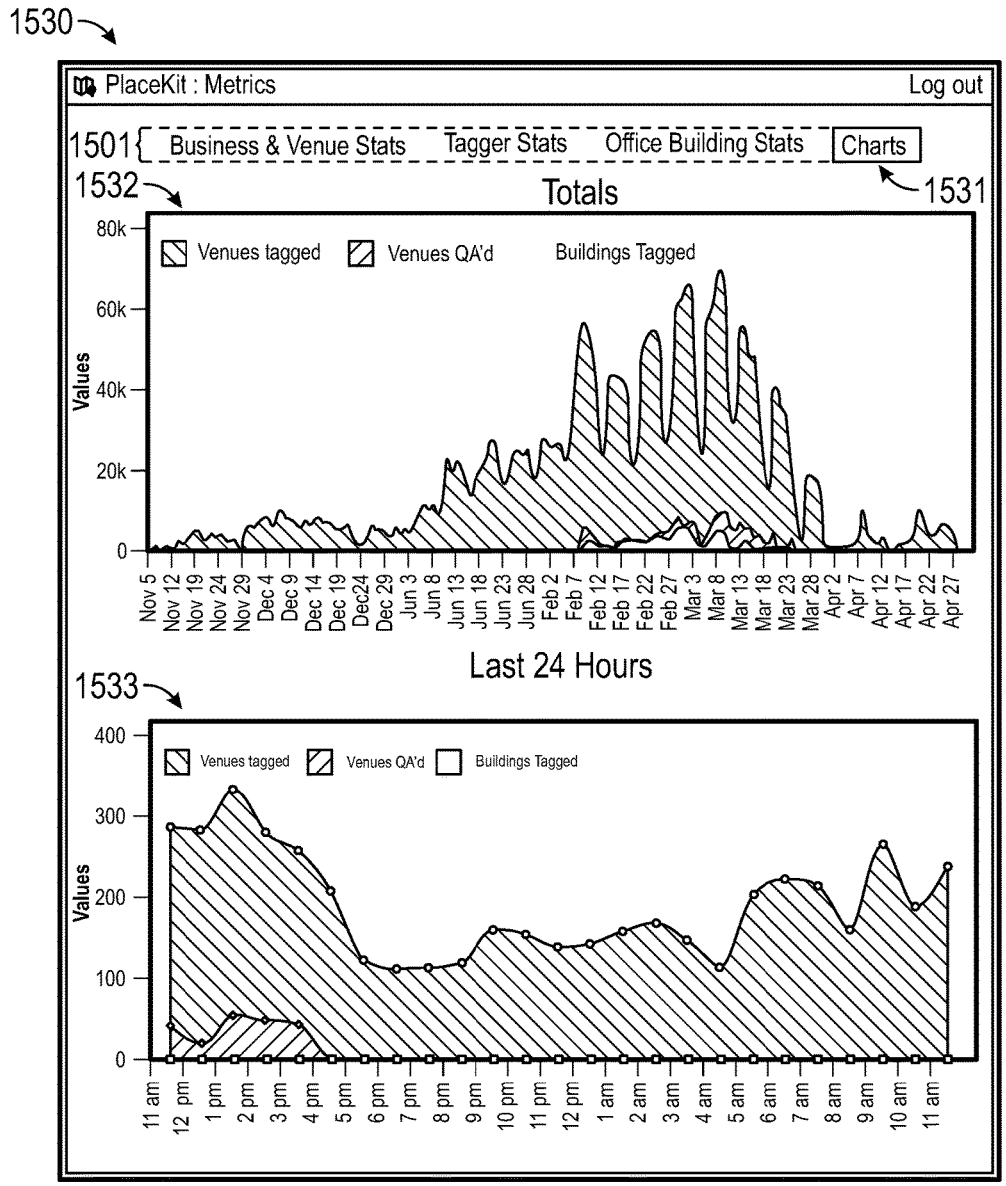

The metrics 436 tool is configured to display various metrics related to data stored in the mapping database 334 and permits for the tracking of tagging progress, analyze data for assessing whether additional taggers are needed, how to apportion taggers to the venue tagger 412 tool, office building tagger 414 tool, place tagger 418 tool, or to the various QA tools 422, 424, 426, and 428. For example, as provided in the example illustration 1500 of FIG. 15A, business and venue statistics 1502 as selected in a toolbar 1501 of the metrics 436 tool include various business and venue statistics 1503 for display. As provided in the example illustration 1510 of FIG. 15B, business and venue statistics 1511 as selected in a toolbar 1501 of the metrics 436 tool include various tagger statistics for display grouped according to total values 1512 and values for the last twenty four hours 1513. As provided in the example illustration 1520 of FIG. 15C, office building statistics 1521 as selected in a toolbar 1501 of the metrics 436 tool include various office building statistics for display grouped according to total values 1522 and values for the last twenty four hours 1523. Finally, as provided in the example illustration 1530 of FIG. 15D, various charts 1531 as selected in a toolbar 1501 of the metrics 436 tool include various graphed data for display grouped according to total history 1532 and over the last twenty four hours 1533.

Venue Auto Updater

The venue auto updater 438 tool is commonly used by an administrative user upon receiving an update or addition to the mapping database 334 of updated venues from a third-party. For example, when a third party provider provides data to the mapping database 334 identifying venues that have been replaced, are new, or have closed, the data is imported into the mapping database 334 and reviewed by an administrative user using the venue auto updater 438 tool.

Figure 16A:
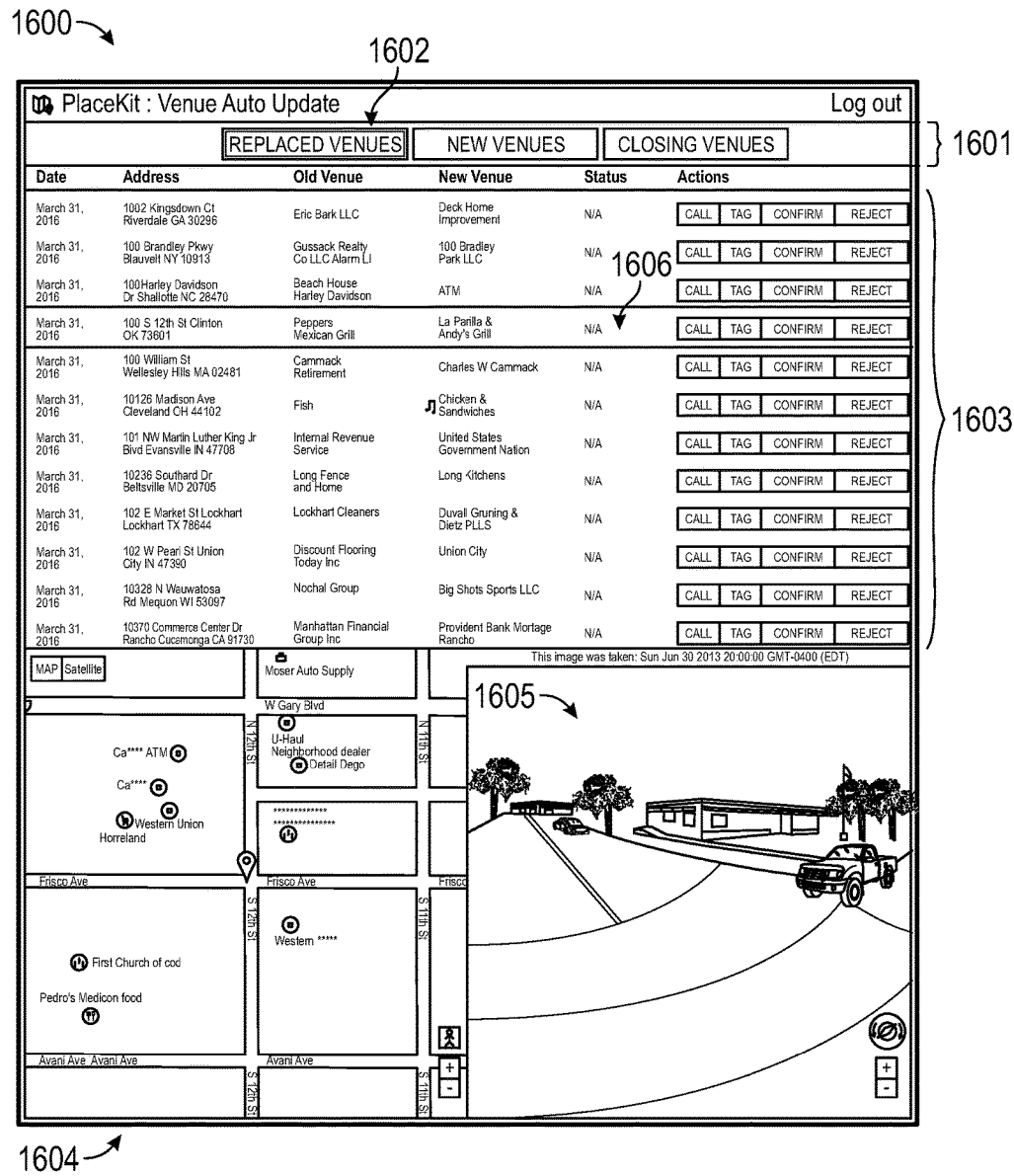

As provided in the example illustration 1600 of FIG. 16A, a user interface in the venue auto updater 438 tool is provided to identify venues that have had one business replace another. For example, if a first coffee store was located at 123 Main St and it closed, and a Mexican restaurant replaced it at that location, the venue auto updater 438 tool would identify and display indicators of that change. Additionally, while venues often change businesses, the storefront edges and entrances for buildings do not commonly change and therefore in order to update a venue using the venue auto updater 438 tool, in many instances only the name of the venue (e.g., business) needs to be updated.

By selecting the replaced venues button 1602 in the toolbar 1601 of the venue auto updater 438 tool, a list of replaced venues 1603 is provided for display. For a selected venue 1606 from the list 1603, the venue auto updater 438 tool provides for display a map 1604 identifying the location of the selected venue 1606 and street-level imagery 1605 associated with the selected venue 1606. The listing 1603 includes, for the selected venue 1606, options for the administrative user to initiate a telephone call (e.g., using Voice-over-IP) from the administrative user's browser to call the venue, tag the venue using the venue tagger 412 tool, and confirm or reject the business listed as a replacement for the previous business at the venue. For example, if the administrative user determines that a business at a location has in fact been replaced, the confirm button will confirm the replacement in the mapping database 334 and assign the locations of the edges of the storefront and entrance(s) of the previous business at the location to the new business. The reject button will indicate that there was no replacement and leave the previously identified data for the business at the location as is.

Figure 16B:
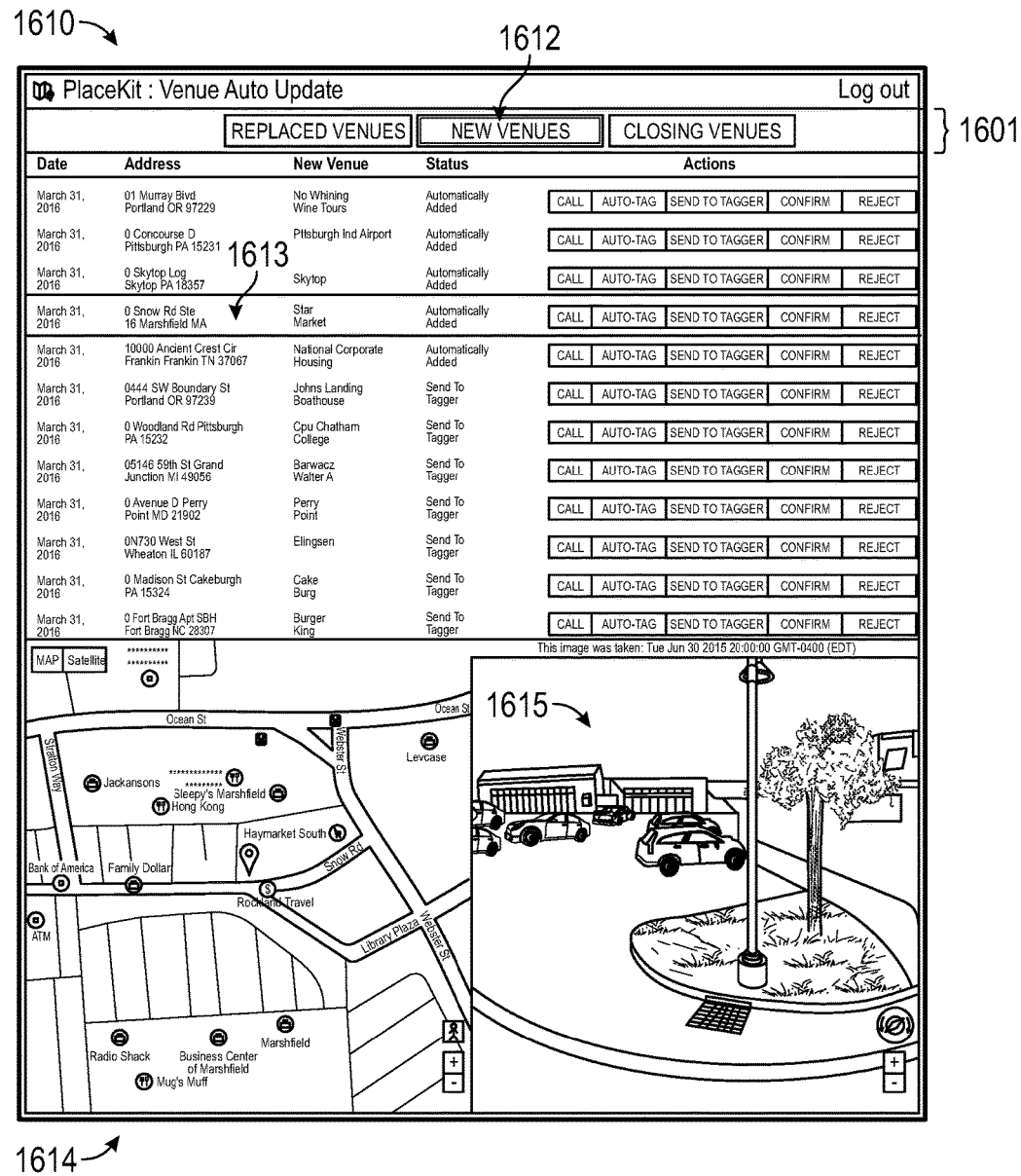

As provided in the example illustration 1610 of FIG. 16B, by selecting the new venues button 1612 in the toolbar 1601 of the venue auto updater 438 tool, a list of venues which were added recently (but not replacing other venues) are provided for display. The listing includes, for a selected venue 1613, options for the administrative user to initiate a telephone call (e.g., using Voice-over-IP) from the administrative user's browser to call the venue, tag the venue using the venue tagger 412 tool, assign the venue to a tagger, and confirm or reject the business listed as being a new venue. For the selected venue 1613 the venue auto updater 438 tool provides for display a map 1614 identifying the location of the selected venue 1613 and street-level imagery 1610 associated with the selected venue 1613.

As provided in the example illustration 1620 of FIG. 16C, by selecting the closing venues button 1622 in the toolbar 1601 of the venue auto updater 438 tool, a list of venues identified as closing or having closed by third-party data are provided in a listing 1623 for display. In certain aspects, the venues are removed from being displayed as active in the mapping database 334 but are displayed in the listing 1623 for reference purposes.

All Maps

Figure 17A:
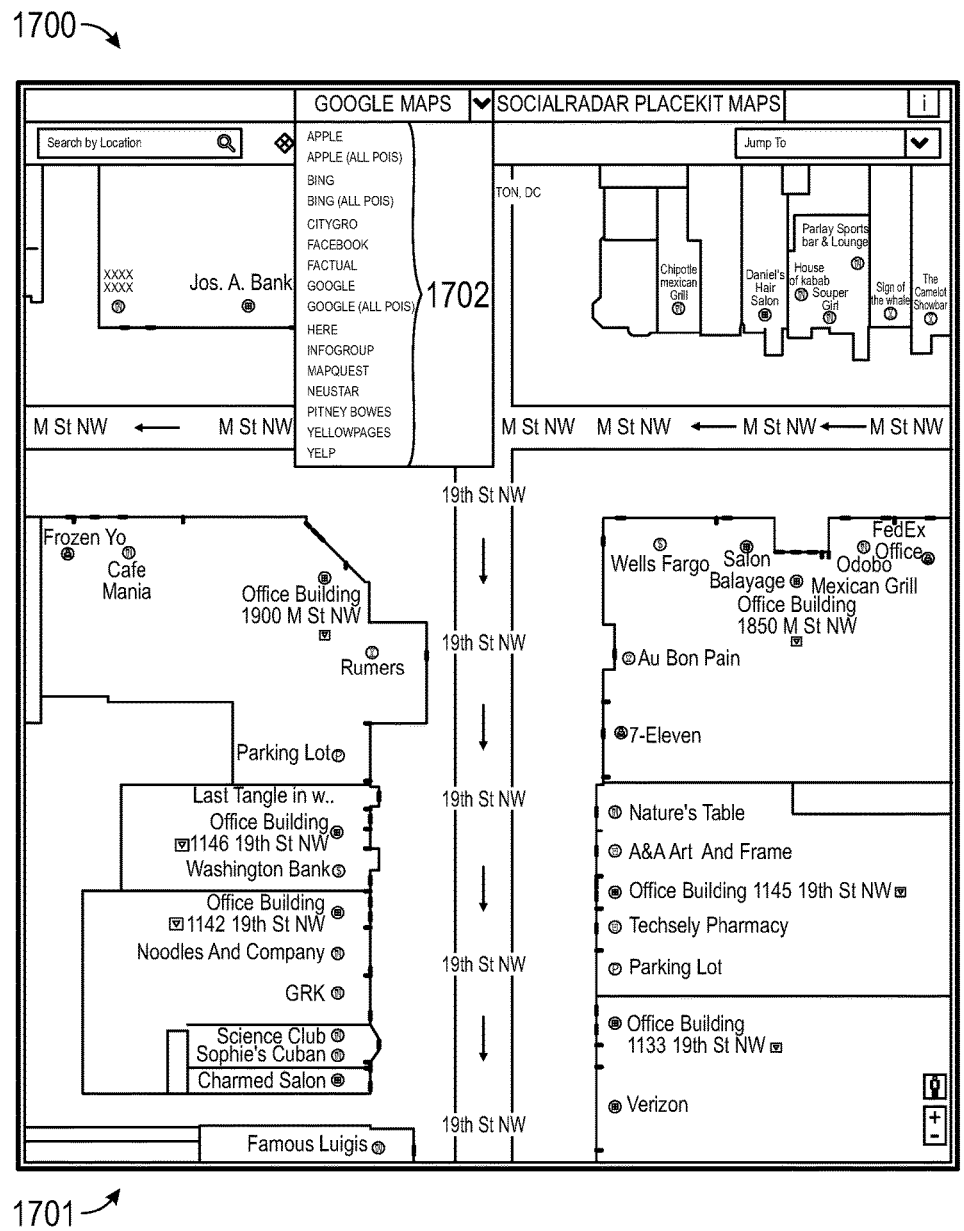
FIGS. 17A and 17B are example illustrations associated with a user interface for viewing maps related to physical objects having identified location, edges, and physical positions in a multi-dimensional space.

As provided in the example illustration 1700 of FIG. 17A, the all maps 442 tool is one of several map tools 440 provided in the dashboard 410 for the location application 340, and is configured to provide for display maps populated with data from the mapping database 334 as compared to maps generated by and/or populated with data from third party services. The all maps 442 tool includes a drop down menu that lists each of the third party services 1702 from whom map data can be displayed in place of the map 1701 displayed using data from the mapping database 334.

Individual Maps

Figure 17B:
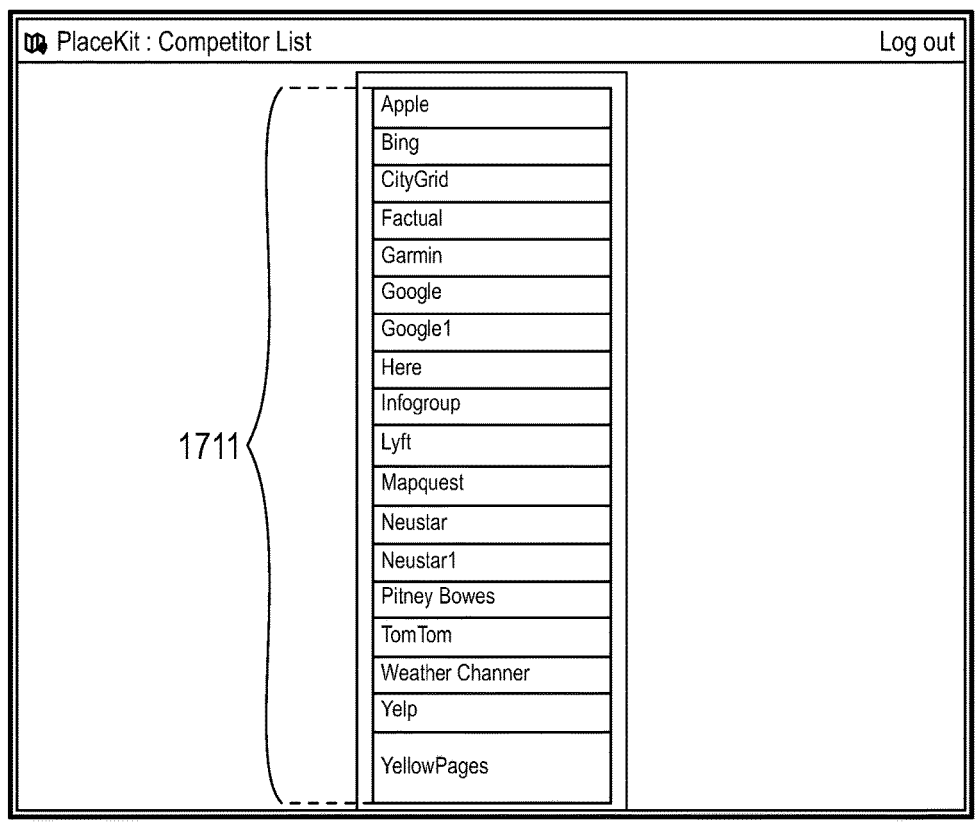

As provided in the example illustration 1710 of FIG. 17B, the individual maps 444 tool provides links to maps generated by the third party services identified in the all maps 442 tool. The individual maps 444 tool is useful, for example, to visually compare maps populated with data from the mapping database 334 to maps generated by and/or populated with data from the third party services.

POI Matcher

Figure 18:
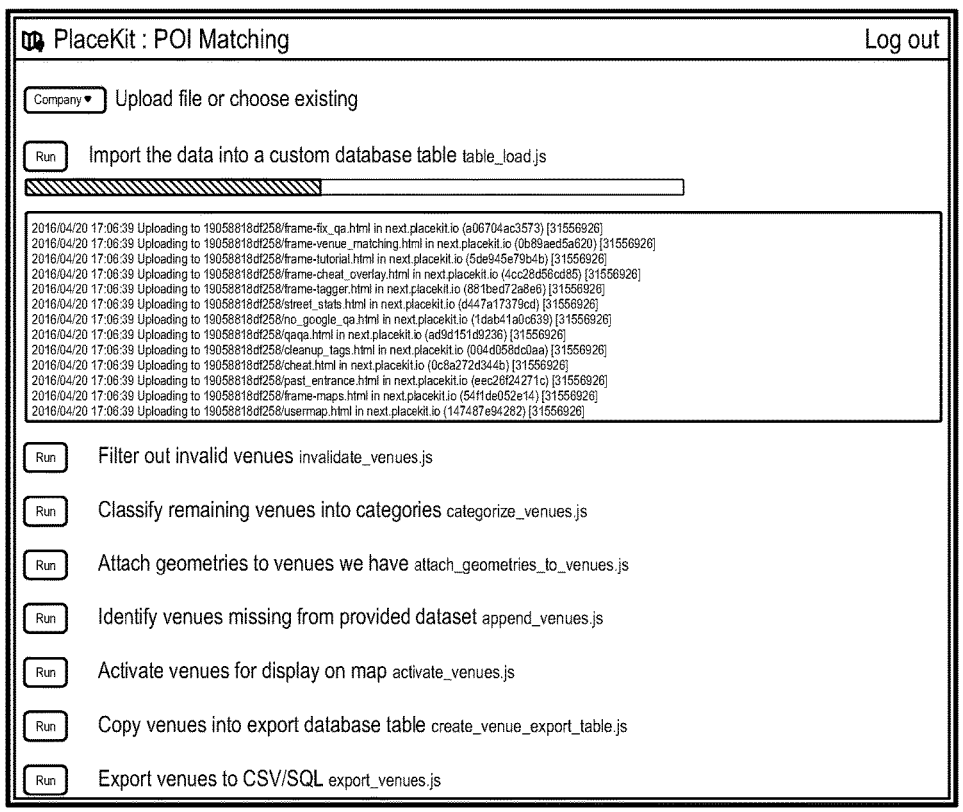
FIG. 18 is an example illustration associated with a user interface for an administrative user to input third-party data related to venue information for physical objects having identified location, edges, and physical positions in a multi-dimensional space.

As provided in the example illustration 1800 of FIG. 18, the point of interest matcher 446 tool is used by administrative users to input third-party data into the mapping database 334, such as data for venues from various sources, to update data in the mapping database 334.

Hardware Overview

Figure 19:
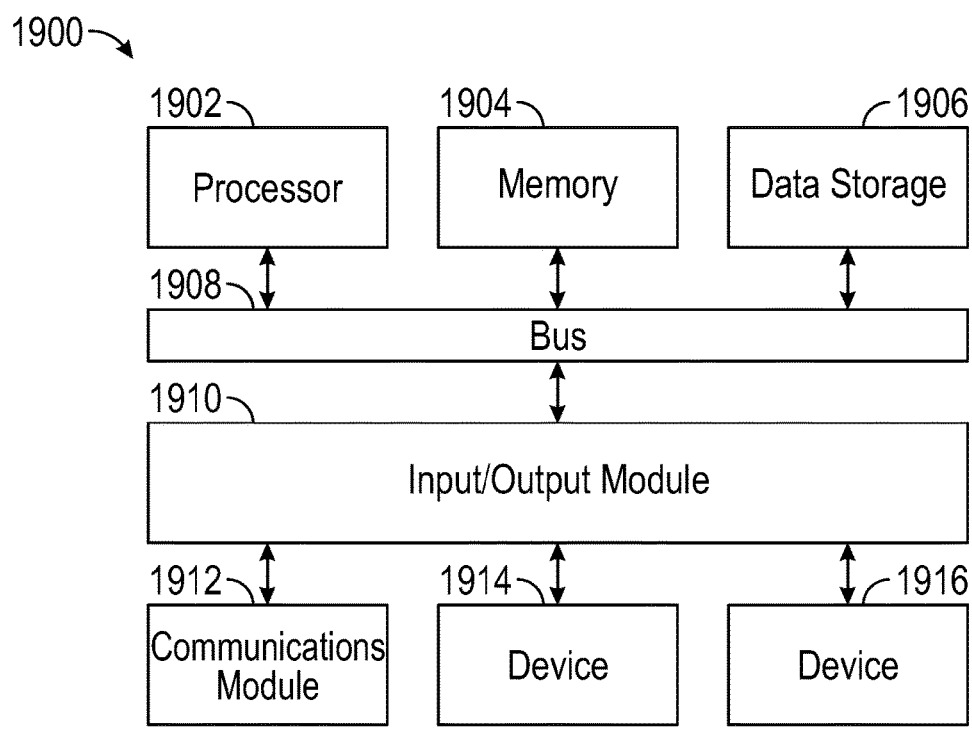
FIG. 19 is a block diagram illustrating an example computer system with which the client and server of FIG. 3 can be implemented.

FIG. 19 is a block diagram illustrating an example computer system 1900 with which the client 110 and server of FIG. 3 can be implemented. In certain aspects, the computer system 1900 may be implemented using hardware or a combination of software and hardware, either in a dedicated server, or integrated into another entity, or distributed across multiple entities.

Computer system 1900 (e.g., client 110 and server 130) includes a bus 1908 or other communication mechanism for communicating information, and a processor 1902 (e.g., processor 212 and 236) coupled with bus 1908 for processing information. According to one aspect, the computer system 600 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 1900 may be implemented with one or more processors 1902. Processor 1902 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 1900 can include, in addition to hardware, code that creates an execution environment for the computer program in question, e.g., code that constitutes processor firmware, a protocol stack, a database management system, an operating system, or a combination of one or more of them stored in an included memory 1904 (e.g., memory 320 and 332), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1908 for storing information and instructions to be executed by processor 1902. The processor 1902 and the memory 1904 can be supplemented by, or incorporated in, special purpose logic circuitry. Expansion memory may also be provided and connected to computer system 1900 through input/output module 1910, which may include, for example, a SIMM (Single In Line Memory Module) card interface. Such expansion memory may provide extra storage space for computer system 1900, or may also store applications or other information for computer system 1900. Specifically, expansion memory may include instructions to carry out or supplement the processes described above, and may include secure information also. Thus, for example, expansion memory may be provided as a security module for computer system 1900, and may be programmed with instructions that permit secure use of computer system 1900. In addition, secure applications may be provided via the SIMM cards, along with additional information, such as placing identifying information on the SIMM card in a non-hackable manner.

The instructions may be stored in the memory 1904 and implemented in one or more computer program products, i.e., one or more modules of computer program instructions encoded on a computer readable medium for execution by, or to control the operation of, the computer system 1900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 1904 may also be used for storing temporary variable or other intermediate information during execution of instructions to be executed by processor 1902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1900 further includes a data storage device 1906 such as a magnetic disk or optical disk, coupled to bus 1908 for storing information and instructions. Computer system 1900 may be coupled via input/output module 1910 to various devices. The input/output module 1910 can be any input/output module. Example input/output modules 1910 include data ports such as USB ports. In addition, input/output module 1910 may be provided in communication with processor 1902, so as to enable near area communication of computer system 1900 with other devices. The input/output module 1910 may provide, for example, for wired communication in some implementations, or for wireless communication in other implementations, and multiple interfaces may also be used. The input/output module 1910 is configured to connect to a communications module 1912. Example communications modules 1912 (e.g., communications module 318 and 338) include networking interface cards, such as Ethernet cards and modems.

The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 1912 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 1912 sends and receives electrical, electromagnetic or optical signals that carry digital data streams representing various types of information. The network link typically provides data communication through one or more networks to other data devices. For example, the network link of the communications module 1912 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through communications module 1912, which carry the digital data to and from computer system 1900, are example forms of transmission media.

Computer system 1900 can send messages and receive data, including program code, through the network(s), the network link and communications module 1912. In the Internet example, a server might transmit a requested code for an application program through Internet, the ISP, the local network and communications module 1912. The received code may be executed by processor 1902 as it is received, and/or stored in data storage 1906 for later execution.

In certain aspects, the input/output module 1910 is configured to connect to a plurality of devices, such as an input device 1914 (e.g., input device 316) and/or an output device 1916 (e.g., output device 318). Example input devices 1914 include a keyboard and a pointing device, e.g., a mouse or a trackball, by which a user can provide input to the computer system 1900. Other kinds of input devices 1914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 1916 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 1916 may comprise appropriate circuitry for driving the output device 1916 to present graphical and other information to a user.

According to one aspect of the present disclosure, the client 110 and server 130 can be implemented using a computer system 1900 in response to processor 1902 executing one or more sequences of one or more instructions contained in memory 1904. Such instructions may be read into memory 1904 from another machine-readable medium, such as data storage device 1906. Execution of the sequences of instructions contained in main memory 1904 causes processor 1902 to perform the process steps described herein. One or more processors in a multi-processing arrangement may also be employed to execute the sequences of instructions contained in memory 1904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components.

Computing system 1900 can include clients and servers. A client and server are generally remote from each other and typically interact through a communication network. The relationship of client and server arises by virtue of computer programs running on the respective computers and having a client-server relationship to each other. Computer system 1900 can be, for example, and without limitation, a desktop computer, laptop computer, or tablet computer. Computer system 1900 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 1902 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 1906. Volatile media include dynamic memory, such as memory 1904. Transmission media include coaxial cables, copper wire, and fiber optics, including the wires that comprise bus 1908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 1908. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method comprising:
   obtaining, by a device, a first two-dimensional image providing an aerial perspective of a building,
      a business being located within the building;
   receiving by the device, a path identifier indicative of a virtual roadway proximal to the building;
   receiving, by the device, a first identifier in the first two-dimensional image of a first edge of the business relative to the building, a second identifier of a second edge of the business relative to the building, and a third identifier of an entrance to the business relative to the building;
   determining by the device, a first latitude and longitude pairing on a map for the first identifier, a second latitude and longitude pairing on the map for the second identifier, and a third latitude and longitude pairing on a map for the third identifier;
   providing, by the device and for display in the first two-dimensional image, an identification of the first edge of the business based on the first identifier, an identification of the second edge of the business based on the second identifier, and an identification of the entrance of the business based on the third identifier; and
   obtaining, by the device, a second two-dimensional image based on the virtual roadway,
      the second two-dimensional image providing a first person perspective of the building.

2. The method of claim 1, further comprising:
   providing, for display in the second two-dimensional image, an identification of the first edge of the business based on the first latitude and longitude pairing for the first identifier, an identification of the second edge of the business based on the second latitude and longitude pairing for the second identifier, and an identification of the entrance of the business based on the third latitude and longitude pairing for the third identifier.

3. The method of claim 1, further comprising:
   receiving a modification to at least one of the first identifier, the second identifier, or the third identifier; and
   updating at least one of the first latitude and longitude pairing, the second latitude and longitude pairing, or the third latitude and longitude pairing based on the received modification.

4. The method of claim 1, further comprising:
   providing, for display, an interface for a user to identify a name of the business.

5. The method of claim 1, further comprising:
   providing, for display in the first two-dimensional image, the identification of the first edge of the business with respect to the building and the identification of the second edge of the business with respect to the building.

6. The method of claim 1, where determining the first latitude and longitude pairing on the map for the first identifier, the second latitude and longitude pairing on the map for the second identifier, and the third latitude and longitude pairing on a map for the third identifier comprises:
   identifying a first axis directed along a first heading in a direction of the first edge of the business and passing through a first position on the map;
   identifying a second axis directed along the first heading in a direction of the second edge of the business and passing through the first position on the map;
   identifying third axis directed along the first heading in a direction of the entrance of the business and passing through the first position on the map;
   identifying a fourth axis directed along a second heading in the direction of the first edge of the business and passing through a second position on the map;
   identifying a fifth axis directed along the second heading in the direction of the second edge of the business and passing through the second position on the map;
   identifying a sixth axis directed along the second heading in the direction of the entrance of the business and passing through the second position on the map;
   identifying, as the first latitude and longitude pairing on the map, a first point on the first axis comprising an intersection on the map between the first axis and the fourth axis;
   identifying, as the second latitude and longitude pairing on the map, a second point on the second axis comprising an intersection on the map between the second axis and the fifth axis; and
   identifying, as the third latitude and longitude pairing on the map, a third point on the third axis comprising an intersection on the map between the third axis and the sixth axis.

7. The method of claim 1, where receiving the path identifier indicative of the virtual roadway proximal to the building comprises:
   receiving the path identifier via at least one of:
      a tactile input device,
      a visual input device, and
      an audio input device.

8. A device comprising:
   a memory; and
   one or more processors to:
      obtain a first two-dimensional image providing an aerial perspective of a building,
         a business being located within the building;
      receive a path identifier indicative of a virtual roadway proximal to the building;
      receive a first identifier in the first two-dimensional image of a first edge of the business relative to the building, a second identifier of a second edge of the business relative to the building, and a third identifier of an entrance to the business relative to the building;
      determine a first latitude and longitude pairing on a map for the first identifier, a second latitude and longitude pairing on the map for the second identifier, and a third latitude and longitude pairing on a map for the third identifier;
      provide, for display in the first two-dimensional image, an identification of the first edge of the business based on the first identifier, an identification of the second edge of the business based on the second identifier, and an identification of the entrance of the business based on the third identifier; and
      obtain a second two-dimensional image based on the virtual roadway,
         the second two-dimensional image providing a first person perspective of the building.

9. The device of claim 8, where the one or more processors are further to:

provide, for display in the second two-dimensional image, an identification of the first edge of the business based on the first latitude and longitude pairing for the first identifier, an identification of the second edge of the business based on the second latitude and longitude pairing for the second identifier, and an identification of the entrance of the business based on the third latitude and longitude pairing for the third identifier.

10. The device of claim 8, where the one or more processors are further to:
receive a modification to at least one of the first identifier, the second identifier, or the third identifier; and
update at least one of the first latitude and longitude pairing, the second latitude and longitude pairing, or the third latitude and longitude pairing based on the received modification.

11. The device of claim 8, where the one or more processors are further to:
provide, for display, an interface for a user to identify a name of the business.

12. The device of claim 8, where the one or more processors are further to:
provide, for display in the first two-dimensional image, the identification of the first edge of the business with respect to the building and the identification of the second edge of the business with respect to the building.

13. The device of claim 8, where the one or more processors, when determining determine the first latitude and longitude pairing on the map for the first identifier, the second latitude and longitude pairing on the map for the second identifier, and the third latitude and longitude pairing on a map for the third identifier, are to:
identify a first axis directed along a first heading in a direction of the first edge of the business and passing through a first position on the map;
identify a second axis directed along the first heading in a direction of the second edge of the business and passing through the first position on the map;
identify third axis directed along the first heading in a direction of the entrance of the business and passing through the first position on the map;
identify a fourth axis directed along a second heading in the direction of the first edge of the business and passing through a second position on the map;
identify a fifth axis directed along the second heading in the direction of the second edge of the business and passing through the second position on the map;
identify a sixth axis directed along the second heading in the direction of the entrance of the business and passing through the second position on the map;
identify, as the first latitude and longitude pairing on the map, a first point on the first axis comprising an intersection on the map between the first axis and the fourth axis;
identify, as the second latitude and longitude pairing on the map, a second point on the second axis comprising an intersection on the map between the second axis and the fifth axis; and
identify, as the third latitude and longitude pairing on the map, a third point on the third axis comprising an intersection on the map between the third axis and the sixth axis.

14. The device of claim 8, where the one or more processors, when receiving the path identifier indicative of the virtual roadway proximal to the building, are to:
receive the path identifier via at least one of:
a tactile input device,
a visual input device, and
an audio input device.

15. A non-transitory machine-readable medium storing instructions, the instructions comprising:
one or more instructions that, when executed by one or more processors, cause the one or more processors to:
obtain a first two-dimensional image providing an aerial perspective of a building,
a business being located within the building;
receive a path identifier indicative of a virtual roadway proximal to the building;
receive a first identifier in the first two-dimensional image of a first edge of the business relative to the building, a second identifier of a second edge of the business relative to the building, and a third identifier of an entrance to the business relative to the building;
determine a first latitude and longitude pairing on a map for the first identifier, a second latitude and longitude pairing on the map for the second identifier, and a third latitude and longitude pairing on a map for the third identifier;
provide, for display in the first two-dimensional image, an identification of the first edge of the business based on the first identifier, an identification of the second edge of the business based on the second identifier, and an identification of the entrance of the business based on the third identifier; and
obtain a second two-dimensional image based on the virtual roadway,
the second two-dimensional image providing a first person perspective of the building.

16. The non-transitory machine-readable medium of claim 15, where the one or more instructions, when executed by the one or more processors, further cause the one or more processors to:
provide, for display in the second two-dimensional image, an identification of the first edge of the business based on the first latitude and longitude pairing for the first identifier, an identification of the second edge of the business based on the second latitude and longitude pairing for the second identifier, and an identification of the entrance of the business based on the third latitude and longitude pairing for the third identifier.

17. The non-transitory machine-readable medium of claim 15, where the one or more instructions, when executed by the one or more processors, further cause the one or more processors to:
receive a modification to at least one of the first identifier, the second identifier, or the third identifier; and
update at least one of the first latitude and longitude pairing, the second latitude and longitude pairing, or the third latitude and longitude pairing based on the received modification.

18. The non-transitory machine-readable medium of claim 15, where the one or more instructions, when executed by the one or more processors, further cause the one or more processors to:
provide, for display, an interface for a user to identify a name of the business.

19. The non-transitory machine-readable medium of claim 15, where the one or more instructions, when executed by the one or more processors, further cause the one or more processors to:
provide, for display in the first two-dimensional image, the identification of the first edge of the business with respect to the building and the identification of the second edge of the business with respect to the building.

20. The non-transitory machine-readable medium of claim 15, where the one or more instructions, that cause the one or more processors to determine the first latitude and longitude pairing on the map for the first identifier, the second latitude and longitude pairing on the map for the second identifier, and the third latitude and longitude pairing on a map for the third identifier, cause the one or more processors to:

identify a first axis directed along a first heading in a direction of the first edge of the business and passing through a first position on the map;

identify a second axis directed along the first heading in a direction of the second edge of the business and passing through the first position on the map;

identify third axis directed along the first heading in a direction of the entrance of the business and passing through the first position on the map;

identify a fourth axis directed along a second heading in the direction of the first edge of the business and passing through a second position on the map;

identify a fifth axis directed along the second heading in the direction of the second edge of the business and passing through the second position on the map;

identify a sixth axis directed along the second heading in the direction of the entrance of the business and passing through the second position on the map;

identify, as the first latitude and longitude pairing on the map, a first point on the first axis comprising an intersection on the map between the first axis and the fourth axis;

identify, as the second latitude and longitude pairing on the map, a second point on the second axis comprising an intersection on the map between the second axis and the fifth axis; and identify, as the third latitude and longitude pairing on the map, a third point on the third axis comprising an intersection on the map between the third axis and the sixth axis.

* * * * *